(12) United States Patent
Krohn

(10) Patent No.: US 7,832,773 B2
(45) Date of Patent: Nov. 16, 2010

(54) ADJUSTABLE CONNECTOR AND METHOD FOR ITS USE

(76) Inventor: Kenneth P. Krohn, 3188 San Helena Dr., Oceanside, CA (US) 92056

( * ) Notice: Subject to any disclaimer, the term of this patent is extended or adjusted under 35 U.S.C. 154(b) by 865 days.

(21) Appl. No.: 11/522,607

(22) Filed: Sep. 18, 2006

(65) Prior Publication Data

US 2008/0084062 A1 Apr. 10, 2008

(51) Int. Cl.
*F16L 17/025* (2006.01)
*F16L 17/06* (2006.01)

(52) U.S. Cl. .................. 285/105; 285/104; 285/108; 285/110; 285/113; 285/322; 285/345; 285/346

(58) Field of Classification Search .............. 285/34, 285/35, 104, 105, 108, 110, 113, 322, 323, 285/324, 343, 345, 346, 403
See application file for complete search history.

(56) References Cited

U.S. PATENT DOCUMENTS

| | | | | |
|---|---|---|---|---|
| 382,514 | A | * | 5/1888 | Davis .................... 285/106 |
| 1,315,784 | A | * | 9/1919 | Levitt ................... 285/222.5 |
| 1,507,981 | A | * | 9/1924 | Winters et al. ........... 285/403 |
| 2,207,619 | A | | 7/1940 | Hildebrand |
| 2,899,217 | A | * | 8/1959 | Ashbrook et al. ......... 285/105 |
| 3,390,898 | A | * | 7/1968 | Sumida .................. 285/34 |
| 3,633,944 | A | | 1/1972 | Hamburg |
| 3,744,822 | A | | 7/1973 | Arnold |
| 3,830,533 | A | | 8/1974 | Mezei et al. |
| 3,847,214 | A | | 11/1974 | Cushman |
| 3,917,318 | A | | 11/1975 | Legris |
| 4,037,864 | A | | 7/1977 | Anderson et al. |
| 4,119,333 | A | * | 10/1978 | Straub .................. 285/112 |
| 4,140,415 | A | | 2/1979 | Koyamato et al. |
| 4,165,109 | A | | 8/1979 | Foti |
| 4,257,629 | A | | 3/1981 | Maple |
| 4,311,314 | A | | 1/1982 | Suman |
| 4,431,216 | A | * | 2/1984 | Legris .................. 285/104 |
| 4,466,640 | A | | 8/1984 | Van Houtte |
| 4,483,555 | A | | 11/1984 | Ludwig |
| 4,505,499 | A | | 3/1985 | Uglow |
| 4,508,369 | A | | 4/1985 | Mode |

(Continued)

OTHER PUBLICATIONS

Krohn, Kenneth, Claim Amendments Under Article 19, PCT Application No. PCT/07/020095, filed with WIPO, dated May 19, 2008, 16 pages.

(Continued)

*Primary Examiner*—James M Hewitt

(57) ABSTRACT

An invention generally relates to an adjustable connector that acts as a coupling device to connect an object (such as pipe or tubing) having a range of diameters and thread styles to an item (such as a piece of equipment or another length of pipe or tubing). The device is generally comprised of a casing member and an internal member, which is further comprised of tab members positioned in tab openings in a core member. Preferably, a semi-flexible sheath covers the internal member and seals it to the casing member and the object, so that a chamber is formed between the internal member and the casing member. Mechanical compression members may be placed in the chamber. As pressure increases within the object, the chamber pressure may also increase, forcing the sheath against the tab members, which are forced against the object, holding the object in place by friction.

44 Claims, 12 Drawing Sheets

U.S. PATENT DOCUMENTS

| | | | |
|---|---|---|---|
| 4,540,201 A * | 9/1985 | Richardson | 285/101 |
| 4,561,682 A | 12/1985 | Tisserat et al. | |
| D283,342 S | 4/1986 | Tisserat et al. | |
| 4,591,192 A | 5/1986 | Van Exel et al. | |
| 4,593,943 A | 6/1986 | Hama | |
| 4,622,703 A | 11/1986 | Cuschera | |
| 4,657,286 A | 4/1987 | Guest | |
| 4,678,208 A | 7/1987 | De Raymond | |
| 4,721,330 A | 1/1988 | Woodhouse | |
| 4,722,560 A | 2/1988 | Guest | |
| 4,805,932 A | 2/1989 | Imhof | |
| 4,919,457 A | 4/1990 | Moretti | |
| 4,946,213 A | 8/1990 | Guest | |
| 5,121,949 A | 6/1992 | Reese | |
| 5,131,632 A | 7/1992 | Olson | |
| 5,156,423 A | 10/1992 | Gifford | |
| 5,161,835 A | 11/1992 | Miyake | |
| 5,171,045 A | 12/1992 | Pasbrig | |
| 5,172,943 A | 12/1992 | Shimada | |
| 5,248,172 A | 9/1993 | Wilson | |
| 5,267,759 A | 12/1993 | Prokop et al. | |
| 5,299,838 A * | 4/1994 | Yang | 285/88 |
| 5,320,326 A | 6/1994 | Ju et al. | |
| 5,322,331 A | 6/1994 | Waldschmidt et al. | |
| 5,328,213 A | 7/1994 | Barth | |
| 5,476,292 A | 12/1995 | Harper | |
| 5,553,901 A | 9/1996 | Serot | |
| 5,580,105 A | 12/1996 | Miller | |
| 5,593,186 A | 1/1997 | Harris | |
| 5,628,343 A | 5/1997 | Lan | |
| 5,779,284 A | 7/1998 | Guest | |
| 5,791,698 A * | 8/1998 | Wartluft et al. | 285/328 |
| 5,813,706 A | 9/1998 | Travis | |
| 5,921,586 A | 7/1999 | Prassas | |
| 5,954,372 A | 9/1999 | Moynihan | |
| 6,027,125 A | 2/2000 | Guest | |
| 6,050,987 A | 4/2000 | Rosenbaum | |
| 6,106,029 A | 8/2000 | DeMore | |
| 6,199,920 B1 | 3/2001 | Neustadtl | |
| 6,231,090 B1 | 5/2001 | Fukao et al. | |
| 6,250,603 B1 | 6/2001 | Knowles et al. | |
| 6,276,727 B1 | 8/2001 | Schlicht | |
| 6,302,451 B1 | 10/2001 | Olson | |
| 6,314,985 B1 | 11/2001 | van der Blom | |
| 6,325,423 B1 | 12/2001 | Guggemos | |
| 6,378,915 B1 | 4/2002 | Katz | |
| 6,454,314 B1 | 9/2002 | Grosspietsch et al. | |
| 6,464,266 B1 | 10/2002 | O'Neill | |
| 6,471,249 B1 | 10/2002 | Lewis | |
| 6,517,124 B1 | 2/2003 | Le Quere | |
| 6,722,702 B1 | 4/2004 | Min-Cheol | |
| 6,832,790 B2 | 12/2004 | Olson | |
| 6,843,514 B2 | 1/2005 | Rex et al. | |
| 6,988,747 B2 | 1/2006 | Allen et al. | |
| 7,004,511 B2 | 2/2006 | Barron et al. | |
| 7,048,309 B2 * | 5/2006 | Gill | 285/104 |
| 7,270,351 B2 | 9/2007 | Chelchowski et al. | |
| 2003/0090105 A1 | 5/2003 | Bartholoma et al. | |
| 2004/0240940 A1 | 12/2004 | Ericksen et al. | |
| 2005/0285395 A1 | 12/2005 | Feith | |
| 2005/0285400 A1 | 12/2005 | Feith | |
| 2007/0096464 A1 | 5/2007 | Spadotto | |
| 2007/0296213 A1 * | 12/2007 | Jones et al. | 285/421 |
| 2008/0277923 A1 * | 11/2008 | Brandt et al. | 285/34 |

OTHER PUBLICATIONS

Krohn, Kenneth, Informal Comments to Written Opinion of ISA, PCT Application No. PCT/07/020095, filed with WIPO, dated May 19, 2008, 28 pages.

Krohn, Kenneth, Claim Amendments Under Article 19, PCT Application No. PCT/07/023538, filed with WIPO, dated Nov. 11, 2008, 24 pages.

Krohn, Kenneth, Informal Comments to Written Opinion of ISA, PCT Application No. PCT/07/023538, filed with WIPO, dated Nov. 11, 2008, 17 pages.

Krohn, Kenneth, Claim Amendments Under Article 19, PCT Application No. PCT/09/031920, filed with WIPO, dated May 22, 2009, 15 pages.

Krohn, Kenneth, Informal Comments to Written Opinion of ISA, PCT Application No. PCT/09/031920, filed with WIPO, dated May 28, 2009, 23 pages.

* cited by examiner 3A
3B

ADJUSTABLE CONNECTOR AND METHOD FOR ITS USE

BACKGROUND

The present invention generally relates to a device that may be used to permanently or removably connect an object (such as a length of pipe or tubing) to an item (such as a pipe fitting, a piece of equipment, a tank, or another length of pipe or tubing), as well as methods of using the device. More specifically, the device may be used to connect objects having different sizes and characteristics to the item. In the preferred embodiment, the device acts as a coupling device to connect pipes or tubing having a range of diameters and thread styles to a given item. For example, a single device may be used to connect the end of a 1" nominal diameter steel pipe (the item) having American Standard Pipe Taper Threads (NPT) to the end of a standard garden hose, or to the end of a ¾" nominal diameter steel pipe having NPT threads, or to the end of a 1" Type L copper pipe.

Apparatus currently exist in the relevant art that are used to connect lengths of pipe and tubing together. For example, copper pipelines often utilize copper fittings, such as standard couplings, tees and elbows, to connect lengths of copper pipe together. Typically, neither the lengths of pipe nor the fittings have threads. Instead, the fittings have openings therein that are designed so that the entire circumference around the end portion of the pipe is held snuggly against the interior surfaces of the opening in the fitting. The end of the pipe is inserted into the opening in the fitting, and a flux/solder (such as lead-based solder) combination or solder (such as silver solder) is used to create a fluid-tight seal between the fitting and the length of pipe. Plastic pipelines, such as those constructed of polyvinyl chloride (PVC), often utilize plastic fittings that are not threaded and function in a manner similar to the copper fittings. In these cases, the end of the length of plastic pipe is inserted into the opening in the fitting, and the pipe is held snuggly against the interior surfaces of the opening in the fitting. A fluid-tight seal is created by using a primer/PVC glue combination on the interfacing surfaces of the pipe and fitting. Some pipelines, such as those constructed of steel, brass, and sometimes plastic, typically utilize fittings, such as couplings, tees and elbows, in which the lengths of pipe have a threaded end and the fittings have a corresponding threaded opening. In these cases, the threaded ends of the pipes are screwed into the threaded openings in the fittings. The fluid-tight seal between the end of the length of pipe and the fitting may be created by the fit of the threads themselves, or by use of a sealing compound in conjunction with the threads.

These examples are but a few of the many ways lengths of pipe and tubing may be connected together. As yet another example, some coupling devices utilize a compression-type means. In these devices, a rubber-type gasket or ring may be positioned on a portion of the length of pipe near the end, the end of the pipe is inserted into the coupling, and the coupling has a means to compress the gasket or ring against the outside surface of the pipe to form a fluid-tight seal and to hold the pipe in position relative to the coupling device. Other coupling devices may utilize the same type of compression mechanism, but a metal or plastic gasket or ring is used instead of the rubber-type gasket or ring. Still other devices may utilize grooves that are cut into the outside surface of the length of pipe. The fittings have corresponding ridges that fit into the grooves to form a fluid-tight seal and hold the pipe in position relative to the coupling device. Some examples of the above fittings include VICTAULIC® and SWAGELOK® coupling systems. It is to be noted that all of the above described coupling means may also be utilized where lengths of pipe or tubing are connected to items other than another length of pipe or tubing. This may be the case, for example, where pipes or tubing are connected to items of equipment or tanks holding fluids.

In each of the coupling devices described above, however, the fittings are generally designed to be used with pipe or tubing having limited characteristics. For example, a ¾" black steel tee having NPT threaded openings can only be used with ¾" nominal diameter pipe having NPT threads on the end of the pipe to be connected to the tee. This tee cannot be directly used with 1" Type L copper pipe. Nor can the ¾" nominal diameter pipe be used with a standard garden hose because the NPT threads on the end of the pipe do not match the threads in the end opening of the garden hose. As another example, a ½" copper coupling can only be used with ½" nominal diameter copper pipe. The coupling cannot be directly used with ½" nominal diameter PVC pipe.

There are, however, instances where it may be desirable to connect lengths of pipe or tubing to items of equipment or other lengths of pipe or tubing, but a single conventional coupling device is not available to make the desired connection. For example, a person may desire to connect a standard garden hose to a ¾" PVC pipe, but a conventional adapting connector is not available. In such cases, the means to make the connection may be inconvenient, difficult, or sometimes even impossible to obtain under the circumstances. Thus, there is a need for a single device that may be used to connect lengths of pipe and tubing having a variety of different sizes and characteristics (such as thread type and style) to a given item, such as an item of equipment or another length of pipe or tubing. A device of this type may be used as an intermediary device to make a fluid-tight connection among a variety of different types of conventional connecting devices (such as those described above) and a variety of different types and sizes of pipes and tubing. In addition, a device of this type may reduce the expense required to make such connections because only one device, as opposed to a combination of conventional coupling devices, is necessary to make the connection. Further, because of the flexibility in use of the device, it may be possible to reduce the number of fittings a person may need to maintain in inventory because one device may be used for a number of different connection types that would otherwise require multiple conventional coupling devices. For example, a plumber involved in service and repair work may need to carry only a few of the devices of the present invention on his or her repair truck, as opposed to a multitude of different types of conventional coupling devices.

It is to be noted, however, that the device of the present invention is not limited to use with lengths of pipe and tubing alone. It may also be used with other objects, such as conduit, tubing (including medical or food grade tubing), pipeline, duct, hose, channel, vent or other similar objects or combinations of such objects, including those having different cross-sectional shapes (such as square or hexagonal). It is also to be noted that the device of the present invention may be used for objects transporting gases or liquids or both, so that references to a "fluid" herein are intended to refer to both gases and liquids.

SUMMARY

The present invention is directed to an adjustable connecting device and methods of using the device that meet the needs discussed above in the Background section. As described in greater detail below, the present invention, when used for its intended purposes, has many advantages over other devices known in the art, as well as novel features that result in a new adjustable connecting device and methods for its use that are not anticipated, rendered obvious, suggested, or even implied by any prior art devices or methods, either alone or in any combination thereof.

One embodiment of the present invention generally discloses a device for connecting an item having an interior space to an object having an interior space. For example, the object may be a length of pipe and the item may be an item of equipment or another length of pipe. In this embodiment, the device is generally comprised of a casing member, an internal member, internal member sealing means (described in more detail below), and item connecting means (described in more detail below). The casing member has a casing interior space and an item opening and an object opening each adjoining the casing interior space. The item opening is of a size and shape adapted to be connected to the item, while the object opening is of a size and shape adapted to receive the object. The internal member is positioned within the casing interior space and is comprised of a core member and at least two tab members. The core member has a core interior space and an internal object opening and an internal item opening each adjoining the core interior space. The internal object opening is of a size and shape adapted to receive the object, while the internal item opening permits the interior space of the object to be in fluid communication with the interior space of the item. The core member also has at least two tab openings, each of the at least two tab openings being of a size and shape adapted to receive a tab member. Each of the at least two tab members corresponds to a tab opening in the core member and is slideably positioned within one of the at least two tab openings. The internal member sealing means (which are described in more detail below) seal the internal member to the casing member and the object in a manner that creates a fluid-tight chamber in the space bounded by the casing member, the internal member, and the object. In addition, the space within the chamber is in fluid communication with the interior space of the object and the interior space of the item. The item connecting means (which are described in more detail below) connect the item opening of the casing member to the item in a fluid-tight manner, so that the interior space of the item is in fluid communication with the chamber and the interior space of the object. A portion of the object extends through the object opening and the internal object opening and is positioned within the core interior space of the internal member approximately adjacent to the at least two tab members. As the pressure within the interior space of the object and the interior space of the item increases, the pressure in the chamber increases, so that force is exerted against the at least two tab members in a manner that forces them against the surface of the object, holding the object in position relative to the at least two tab members by friction. When thrust loads increase as a result of pressure increases in the interior space of the object and the item, the increasing pressure in the chamber causes the at least two tab members to hold the object in place by friction, which allows the object sealing means (described in more detail below) to maintain the seal between the object and device.

In some embodiments, the casing member may be further comprised of a case body having two end portions, a case base connected to the case body at one end portion of the case body, a case cap, and case cap connecting means (which are described in more detail below) to removably or permanently connect the case cap to the other end portion of the case body. In other embodiments, the case body and the core member may be approximately tubular in shape. In various embodiments, the at least two tab members may further comprise object gripping means, such as surface ridges or gritted portions or both, to assist in holding the object in position relative to the at least two tab members by friction. In yet other embodiments, the internal member sealing means may be comprised of a semi-flexible sheath positioned on the exterior surface of the internal member. The sheath may be comprised of a polymer material, and the internal member sealing means may be further comprised of an adhesive that seals the distal end of the object to the sheath. The internal member sealing means (which are described in more detail below) may also be comprised of object sealing means (also described in more detail below) to seal the object to the device. The device may also further comprise mechanical compression means, such as at least one spring mechanism or at least one compressible insert, positioned in the chamber to force the at least two tab members against the object. In some embodiments, the device may further comprise the object or the item or both. The item connecting means (which are described in more detail below) may also be comprised of a threaded, soldered, welded or glued connection or any combination of such connections.

The present invention also includes a method of connecting the object to the item using the device. The method comprises the following actions performed in any order. First, the object is inserted into the object opening and the internal object opening of the device so that the internal member sealing means seals the internal member to the casing member and the object in a fluid-tight manner. Second, the item is connected to the device using the item connecting means. The method may also further comprise the action of pressurizing the fluid within the interior space of the item and the interior space of the object, so that the pressure in the chamber increases and force is exerted against the at least two tab members in a manner that forces them against the surface of the object, holding the object in position relative to the device by friction.

Another embodiment of the present invention also discloses a device for connecting an item having an interior space to an object having an interior space. In this embodiment, the device comprises a hollow casing member, a hollow internal member, at least one sealing member, and item connecting means, which serve the same function as the item connecting means described above. The hollow casing member has two end portions, an item opening positioned at one end portion of the casing member that is of a size and shape adapted to connect to the item, and an object opening positioned at the other end portion of the casing member that is of a size and shape adapted to receive the object. The hollow internal member is positioned within the casing member and is comprised of a core member, at least two tab members, and object gripping means (which are described in more detail below). The core member has two end portions, an internal object opening positioned at one end portion of the core member, an internal item opening positioned at the other end portion of the core member, and at least two tab openings. The internal object opening is positioned approximately adjacent to the object opening in the casing member. The internal item opening is positioned approximately adjacent to the item opening in the casing member and permits the interior space of the object to be in fluid communication with the interior space of the item. Each of the at least two tab openings is of a size and shape adapted to receive a tab member. Each of the at least two tab members corresponds to a tab opening in the core member, and is slideably positioned within one of the at least two tab openings. The object gripping means (which are described in more detail below) assist in holding the object in position relative to the at least two tab members by friction. The at least one sealing member is used to seal the at least two tab openings and to seal the core member to the casing member and the object in a manner that creates a chamber in the space bounded by the casing member, the internal member, and the object. The space within the chamber is in fluid communication with the interior space of the object and the interior space of the item. A portion of the object is positioned within the interior space of the internal member approximately adjacent to the at least two tab members. Pressure in the chamber exerts force against the at least two tab members in a manner that forces them against the surface of the object, holding the object in position relative to the internal member by friction.

In some embodiments, the casing member and the core member are each approximately tubular in shape. In other embodiments, the at least one sealing member is comprised of an upper sealing member that is positioned between the portion of the core member adjacent to the interior object opening and the portion of the casing member adjacent to the object opening. The upper sealing member creates a fluid-tight seal between the core member and the casing member at such position. In still other embodiments, the at least one sealing member is comprised of a lower sealing member that is positioned between the portion of the core member adjacent to the interior item opening and the portion of the casing member adjacent to the item opening. The upper sealing member creates a fluid-tight seal between the core member and the casing member at such position. The at least one sealing member may be further comprised of an adhesive that seals the distal end of the object to the lower sealing member. The present invention also includes a method of connecting the object to the item using this embodiment of the device, which is described in more detail herein.

Another embodiment of the present invention also discloses a device for connecting an item having an interior space to an object having an interior space. In this embodiment, the device comprises a hollow casing member, a hollow internal member, internal member sealing means, and item connecting means, which serve the same function as the item connecting means described above. The hollow casing member has two end portions, an item opening positioned at one end portion of the casing member that is of a size and shape adapted to connect to the item, and an object opening positioned at the other end portion of the casing member that is of a size and shape adapted to receive the object. The hollow internal member is positioned within the casing member and is comprised of a core member, at least two primary tab members, and at least two secondary tab members. The core member has two end portions, an internal object opening positioned at one end portion of the core member, an internal item opening positioned at the other end portion of the core member, at least two primary tab openings, and at least two secondary tab openings. The internal object opening is positioned approximately adjacent to the object opening in the casing member. The internal item opening is positioned approximately adjacent to the item opening in the casing member and permits the interior space of the object to be in fluid communication with the interior space of the item. The at least two secondary tab openings are positioned approximately adjacent to the internal item opening, and are of a size and shape adapted to receive a secondary tab member. The at least two primary tab openings are positioned between the at least two secondary tab openings and the internal object opening, and are of a size and shape adapted to receive a primary tab member. Each of the at least two primary tab members corresponds to a primary tab opening in the core member, and is slideably positioned within one of the at least two primary tab openings. Each of the at least two secondary tab members corresponds to a secondary tab opening in the core member, and is slideably positioned within one of the at least two secondary tab openings. The internal member sealing means (which are described in more detail below) are used to seal the internal member to the casing member and the object in a manner that creates a chamber in the space bounded by the casing member, the internal member, and the object. The space within the chamber is in fluid communication with the interior space of the object and the interior space of the item. A portion of the object is positioned within the interior space of the internal member approximately adjacent to the at least two tab members. Pressure in the chamber exerts force against the at least two tab members in a manner that forces them against the surface of the object, holding the object in position relative to the internal member by friction.

In some embodiments, the casing member may be further comprised of a case body having two end portions, a case base connected to the case body at one end portion of the case body, a case cap, and case cap connecting means (which are described in more detail below) to removably or permanently connect the case cap to the other end portion of the case body. In some embodiments, the case body and the core member are approximately tubular in shape. In other embodiments, the at least two primary tab members and the at least two secondary tab members may further comprise object gripping means to assist in holding the object in position relative to the at least two primary tab members and the at least two secondary tab members, respectively, by friction. In still other embodiments, the at least two secondary tab members are comprised of a ridge on the surface thereof that faces the object, but the at least two primary tab members do not have a ridge on the surface thereof that faces the object. The device may also further comprise primary mechanical compression means and secondary mechanical compression means positioned in the fluid-tight chamber to force the at least two primary tab members and the at least two secondary tab members, respectively, against the object. The present invention also includes a method of connecting the object to the item using this embodiment of the device, which is described in more detail herein.

Another embodiment of the present invention generally discloses a device for connecting an item having an interior space to an object having an interior space. In this embodiment, the device is generally comprised of a casing member, an internal member, object/device sealing means (described in more detail below), mechanical compression means (described in more detail below), and item connecting means (described in more detail below). The casing member has a casing interior space and an item opening and an object opening each adjoining the casing interior space. The item opening is of a size and shape adapted to be connected to the item, while the object opening is of a size and shape adapted to receive the object. The internal member is positioned within the casing interior space and is comprised of a core member and at least two tab members. The core member has a core interior space and an internal object opening and an internal item opening each adjoining the core interior space. The internal object opening is of a size and shape adapted to receive the object, while the internal item opening permits the interior space of the object to be in fluid communication with the interior space of the item. The core member also has at least two tab openings, each of the at least two tab openings being of a size and shape adapted to receive a tab member. Each of the at least two tab members corresponds to a tab opening in the core member and is slideably positioned within one of the at least two tab openings. A portion of the object extends through the object opening and the interior object opening and is positioned within the core interior space of the internal member approximately adjacent to the at least two tab members. The object/device sealing means (described in more detail below) are used to seal the object to the device in a manner that creates a fluid-tight seal between the object and the device. The interior space of the object is in fluid communication with the interior space of the item. In addition, a chamber is formed in the casing interior space between the internal member and the casing member. The space within the chamber is not, however, in fluid communication with the interior space of the object or the interior space of the item. The mechanical compression means (described in more detail below) are positioned within the chamber to force the at least two tab members against the surface of the object, holding the object in position relative to the at least two tab members by friction.

In some embodiments, the casing member and the core member may be approximately tubular in shape. In various embodiments, the at least two tab members may further comprise object gripping means (described in more detail below). In yet other embodiments, the object/device sealing means may be comprised of a semi-flexible sheath positioned on the exterior surface of the internal member. The sheath may be comprised of a polymer material, and the object/device sealing means may be further comprised of an adhesive that seals the distal end of the object to the sheath. The device may also be comprised of core member sealing means (also described in more detail below) to seal the internal member to the casing member. The device may also further comprise mechanical compression means (also described in more detail below). In some embodiments, the object/device sealing means may be comprised of a lower sealing member that is positioned between the portion of the core member adjacent to the interior item opening and the portion of the casing member adjacent to the item opening, wherein the lower sealing member creates a fluid-tight seal between the object, the core member, and the casing member at such position. The present invention also includes a method of connecting the object to the item using this embodiment of the device, which is described in more detail herein.

As may be noted from the preceding summary, and the following detailed description, the device of the present invention meets the needs discussed above in the Background section. For example, the device may be used to connect objects of various sizes and end characteristics (such as threads) within a predetermined range to an item, as described in more detail below. Thus, the device of the present invention provides all of the functions desired in a single device.

There has thus been outlined, rather broadly, the more primary features of the present invention. There are additional features that are also included in the various embodiments of the invention that are described hereinafter and that form the subject matter of the claims appended hereto. In this respect, it is to be understood that the invention is not limited in its application to the details of construction and to the arrangements of the components set forth in the following description or illustrated in the following drawings. This invention may be embodied in the form illustrated in the accompanying drawings, but the drawings are illustrative only and changes may be made in the specific construction illustrated and described within the scope of the appended claims. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

The foregoing summary, as well as the following description, will be better understood when read in conjunction with the appended drawings, in which.

DETAILED DESCRIPTION

Reference will now be made in detail to the preferred aspects, versions and embodiments of the present invention, examples of which are illustrated in the accompanying drawings. While the invention will be described in conjunction with the preferred aspects, versions and embodiments, it is to be noted that the aspects, versions and embodiments are not intended to limit the invention to those aspects, versions and embodiments. On the contrary, the invention is intended to cover alternatives, modifications and equivalents, which may be included within the spirit and scope of the invention as defined by the appended claims.

Figure 1:
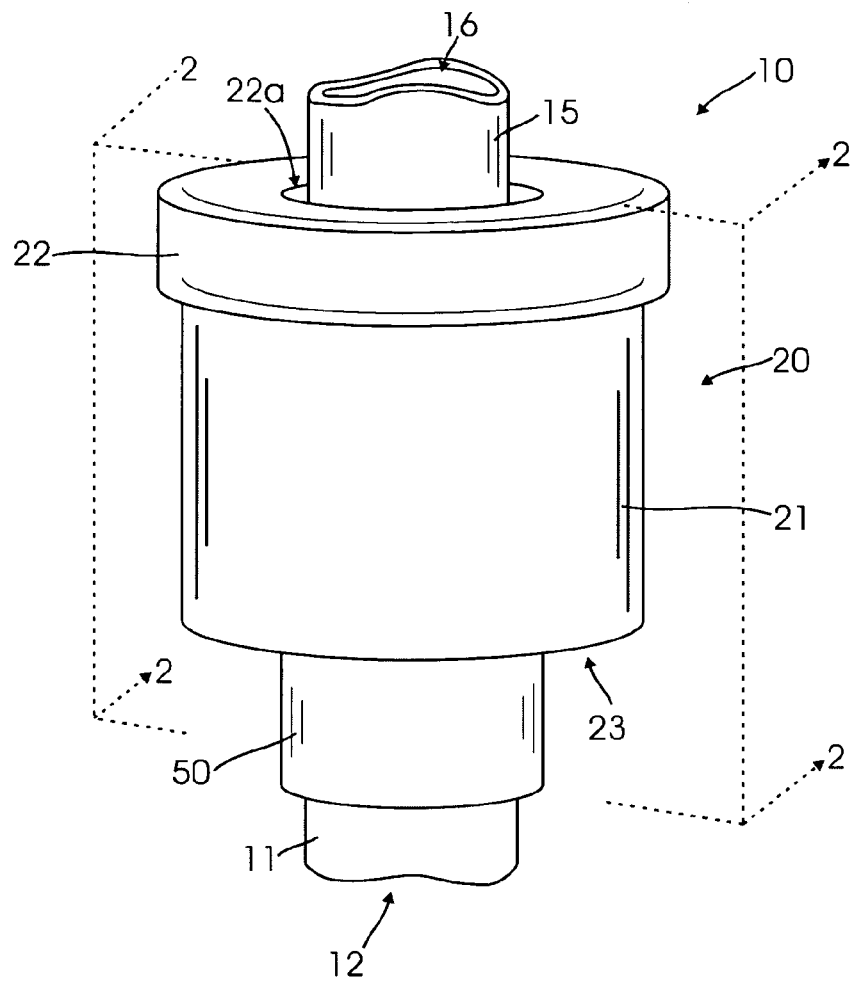
FIG. 1 is a perspective view of an embodiment of a device of the present invention, as viewed from the side of and above the device.
Figure 2:
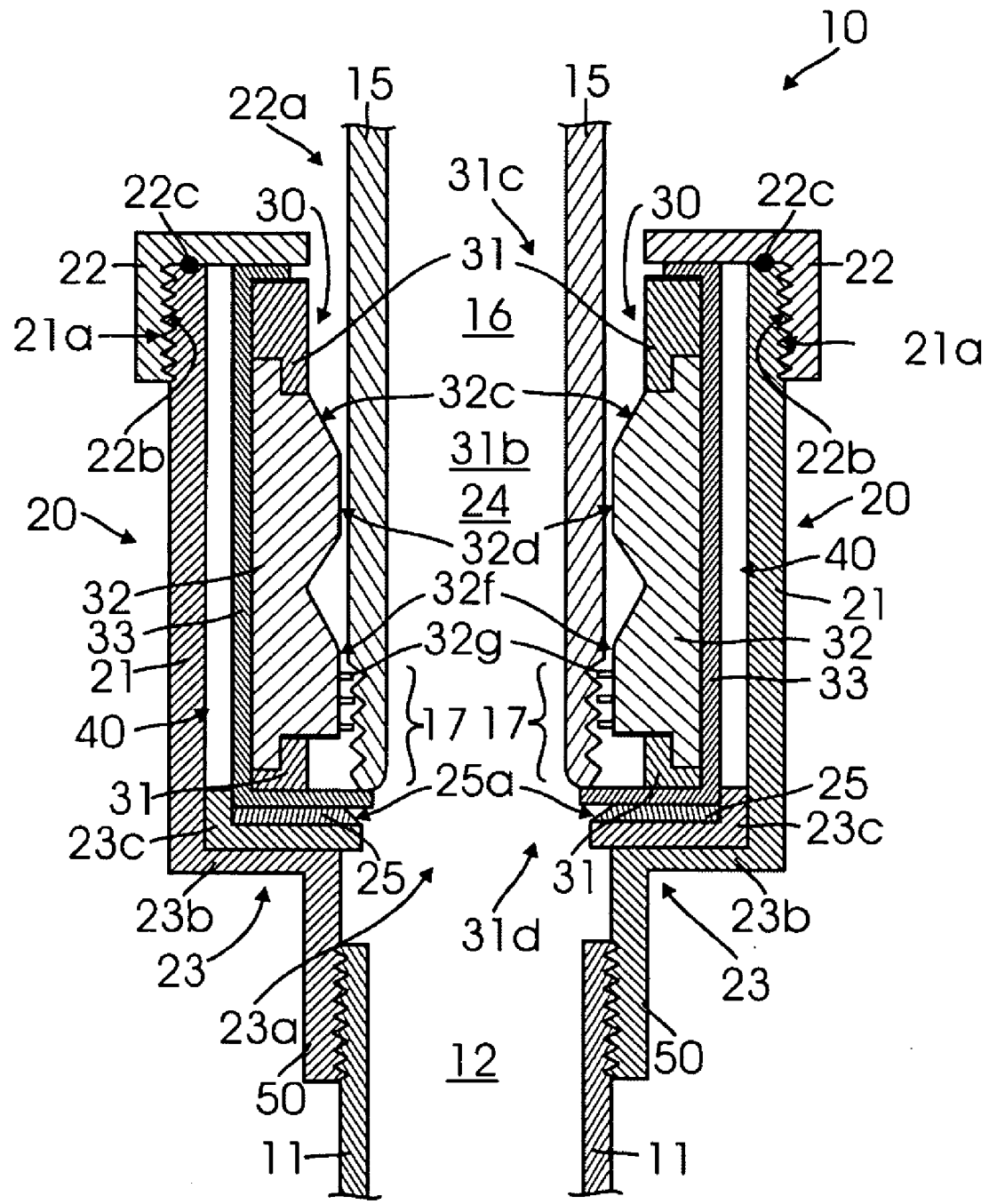
FIG. 2 is a sectional elevation view of the embodiment of the device illustrated in FIG. 1, as generally taken along the lines 2-2 in FIG. 1.

One embodiment of the present invention is illustrated in FIG. 1 and FIG. 2. FIG. 2 presents a sectional view of the device 10 illustrated in FIG. 1, and serves to illustrate the interior components and operation of the device 10. The device 10 may be used for connecting an item (such as the pipe 11 illustrated in FIG. 1 and FIG. 2) having an interior space 12 to an object (also a pipe 15 in the illustrated embodiment) having an interior space 16. In some embodiments, the device 10 may be further comprised of the object (pipe 15). In other embodiments, the device 10 may be further comprised of the item (pipe 11). A particular advantage of the present invention is that one device 10 may be used to connect objects (such as pipe 15) having different sizes and features to another item, such as pipe 11. Thus, as illustrated in FIG. 1 and FIG. 2, the device 10 may be used to connect pipe 11 to objects (such as pipe 15) having different diameters and thread styles on the end 17 thereof. For example, in some embodiments, one device 10 may be suitable for connecting the item (pipe 11) to a typical garden hose with a standard hose thread on one end 17, to a ¾" PVC pipe having NPT threads on one end 17, to a ¾" PVC pipe having no threads on its end 17, or to a 1" Type L copper pipe with no threads on its end 17. Although the illustrated object (pipe 15) has a tubular shape with a threaded end 17, in other embodiments the object 15 may be comprised in whole or in part of conduit, tubing (including medical or food grade tubing), pipeline, duct, hose, channel, vent or other similar objects or combinations of such objects that may be currently known in the relevant art or that may be developed in the art in the future. Similarly, the object (pipe 15) may have other shapes in other embodiments. For example, the object (pipe 15) may have a cross-section that is approximately ellipsoidal, triangular, square, rectangular, pentagonal, hexagonal, another polygonal shape, or another shape or combination of such shapes. Further, the object (pipe 15) may have a variety of different thread types on the threaded end 17 of the pipe 15. For example, the threaded end 17 may have American Standard Pipe Taper Threads (NPT), American Standard Straight Coupling Pipe Threads (NPSC), American Standard Taper Railing Pipe Threads (NPTR), American Standard Straight Mechanical Pipe Threads (NPSM), American Standard Straight Locknut Pipe Threads (NPSL), American Standard Pipe Taper Threads (Dryseal; NPTF), American Fuel Internal Straight Pipe Thread (NPSF), British Standard Pipe Threads (tapered—BSPT, and parallel—BSPP), or any other type of threads. Alternatively, the object (pipe 15) may have no threads or a different type of connector means (such as a VICTAULIC® groove) on the end (pipe end 17) thereof. The object (pipe 15) may also be comprised of any materials suitable for constructing conduit, tubing, pipeline, duct, hose, channel, vent or similar objects. Examples include metals (such as steel, steel alloys, aluminum, copper, brass, and other metals and metal alloys), polymers (such as polyvinyl chloride, polyethylene, ABS, rubber (including neoprene), silicon, and other polymers), wood, glass, fiberglass, carbon-based and other composites, or other materials or combinations of such materials. Similarly, the item (pipe 11) may have any of the structures, features or characteristics of the object (pipe 15) described above). In addition, the item (pipe 11) may also be comprised in whole or in part of equipment, machinery, tanks, or other items or combinations of such items to which it may be desirable to connect the object (pipe 15) in a manner that provides for fluid communication between the interior space 12 of the item (pipe 11) with the interior space 16 of the object (pipe 15). This connection may also provide a fluid-tight seal between the object (pipe 15) and the item (pipe 11). It is to be noted that references herein to the pipe 15 and the pipe 11 may also be deemed to refer to any of the other types of objects or items, respectively, described above with respect to the various embodiments of the present invention.

In the embodiment of the present invention illustrated in FIG. 1 and FIG. 2, and FIG. 3A and FIG. 3B in the case of some aspects, the device 10 is generally comprised of a casing member 20, an internal member 30, internal member sealing means, and item connecting means, all of which are described in more detail below. In the illustrated embodiment of the device 10, the casing member 20 is further comprised of a hollow, approximately tubular-shaped case body 21, a case cap 22 positioned at one end of the case body 21, and a case base 23 positioned at the opposite end of the case body 21. The case cap 22 has an object opening 22a positioned therein that is of a size and shape adapted to receive the object (pipe 15). The case cap 22 may be removably or permanently connected to the case body 21 by case cap connecting means, which are described in more detail below. The case base 23 has an item opening 23a positioned therein that is of a size and shape adapted to be connected to the item (pipe 11). Although the case body 21 is approximately tubular in the illustrated embodiment, the casing member 20 may have other shapes in other embodiments of the device 10, as long as the casing member 20 has an interior space 24 and an item opening 23a and an object opening 22a each adjoining the interior space 24, wherein the item opening 23a is of a size and shape adapted to be connected to the item (pipe 11), and the object opening 22a is of a size and shape adapted to receive the object (pipe 15). As an example of an alternate shape, all or a portion of the case body 21 may be hexagonal in shape when viewed from above an end of the case body 21. This shape may assist the user of the device 10 in holding the case body 21 with a pipe wrench, adjustable wrench, or other tool in operation of the device 10. As other examples, the case body 21 may be approximately ellipsoidal, triangular, square, rectangular, pentagonal, another polygonal shape, other shapes having arcuate or linear portions, or another shape or combination of such shapes, as long as the case member 20 cooperates with the internal member 30 in operation of the device 10, as described in more detail below. Preferably, the case body 21 is approximately tubular in shape.

The size and shape of the case body 21 are dependent upon a number of factors, such as the anticipated size or range of sizes of the object (pipe 15), the size of the item (pipe 11), the size of the internal member 30, the anticipated operating pressures of the device 10 (i.e., the pressures expected in the chamber 40, which is described in more detail below), the materials comprising the case body 21, the type of internal member sealing means (described in more detail below) utilized in the device 10, the use of mechanical compression means (described in more detail below), the preferences of the user of the device 10, and other factors. The wall thickness of the case body 21 is generally dependent upon the same type of factors. In addition, the case body 21 may be comprised of any suitable type of material. For example, the case body 21 may be comprised of metal (such as steel, steel alloys, aluminum, copper, brass, and other metals and metal alloys), polymers (such as polyvinyl chloride, polyethylene, polypropylene, ABS and other polymers), wood, fiberglass, carbon-based or other composites, or other materials or combinations of such materials. The preferred material is dependent upon a number of different factors, such as the anticipated size or range of sizes of the object (pipe 15), the size of the item (pipe 11), the type of connection to be made to the item (pipe 11), the size of the internal member 30, the anticipated operating pressures of the device 10 (i.e., the pressures expected in the chamber 40), the anticipated operating or installation temperatures of the device 10, the desired wall thickness and weight of the case body 21, the use of mechanical compression means (described in more detail below), the type of internal member sealing means and item connecting means (both described in more detail below) utilized in the device 10, the preferences of the user of the device 10, and other factors. The case body 21 may be fabricated using any suitable means. For example, a case body 21 constructed of PVC may be formed by injection molding.

The case base 23 is positioned at one end of the case body 21. In the illustrated embodiment, as best viewed in FIG. 3B and secondarily in FIG. 2, the item opening 23a of the case base 23 is positioned in a base plate member 23b. In addition, the case base 23 is comprised of a plurality of base support members 23c that extend radially outward from the edge of the item opening 23a to the interior surface of the case body 21. The base support members 23c are generally L-shaped, so that they have a greater height above the interior surface of the base plate member 23b adjacent to the case body 21 than they do adjacent to the item opening 23a. As illustrated in FIG. 3B, a flange member 25 is positioned adjacent to the lower portion of the L-shaped base support members 23c. The flange member 25 is of a size and shape so that it may be positioned adjacent to the lower portion of the L-shaped base support members 23c and may be held in place radially by the raised portion of the L-shaped base support members 23c. The flange member 25 may be placed in position on the base support members 23c without more, or it may be attached to the base support members 23c, such as by adhesives, welding, fusing, fasteners or other means or a combination of such means. Alternatively, the flange member 25 may be fabricated as a part of the base plate member 23b. Thus, referring primarily to FIG. 2, when the internal member 30 is positioned within the casing member 20, as described in more detail below, a chamber 40 is formed between the interior surfaces of the case body 21, the case cap 22, the base plate member 23b, and the external surface of the internal member 30. This chamber 40 is in fluid communication with the interior space 16 of the object (pipe 15) and the interior space 12 of the item (pipe 11) by means of the spaces between the base support members 23c, the flange member 25, and the base plate member 23b. The case base 23 may be of almost any shape and size, as long as it cooperates with the shape of the case body 21 and the internal member 30 to form the fluid-tight chamber 40 and permit the fluid communication between the chamber 40, the interior space 12 of the item (pipe 11), and the interior space 16 of the object (pipe 15). Similarly, the base support members 23c may also be of almost any shape as long as they support the same type of cooperation. Preferably, the case base 23 is in the shape illustrated in FIG. 3B. The case base 23 may generally be comprised of any materials or combinations of materials that may be used to construct the case body 21, as described in detail above and illustrated in connection with FIG. 1 through FIG. 3B. Although the case base 23 need not be constructed of the same material as the case body 21, the case base 23 is preferably constructed of the same material. The case base 23 may be fabricated using any suitable manufacturing means. For example, a case base 23 comprised of PVC may be formed by injection molding. The base support members 23c may be fabricated as a single piece along with the remaining portions of the case base 23, or they may be separately fabricated and attached to the remaining portions of the case base 23, such as by adhesives, epoxies, welding, fusing, nails, screws, clips, clamps, nuts, bolts, or other fasteners or combinations of such means. Although the case base 23 (including the base support members 23c) is preferably fabricated as a part of the case body 21, the case base 23 may also be fabricated separately and attached to the case body 21 using any suitable means, as long as such means provide a fluid-tight seal between the case body 21 and the case base 23. Examples of such means include adhesives, epoxies, welding, fusing, nails, screws, clips, clamps, nuts, bolts, or other fasteners or combinations of such means. Alternatively, the case base 23 may be permanently or removably attached to the case body 21 using any of the case cap connecting means that may be used to permanently or removably connect the case cap 22 to the case body 21, as described in more detail below.

Generally, the item (pipe 11) is connected to the casing member 20 by the item connecting means. In the embodiment of the device 10 illustrated in FIG. 1 through FIG. 3B, the item connecting means is comprised of a female iron pipe (FIP) adapter 50 fabricated as a part of the base plate member 23b. In this embodiment, the FIP adapter 50 is positioned on the case base 23 so that the longitudinal axis of the FIP adapter 50 passes through the center of the item opening 23a of the case base 23. In other embodiments, the FIP adapter 50 (or other item connecting means) may be positioned on a different portion of the casing member 20, as long as the position does not adversely affect the operation of the device 10, as described in more detail below. For example, the FIP adapter 50 may be positioned in the case base 23 approximately adjacent to the side wall of the case body 21, rather than approximately in the center of the case base 23. In addition, the FIP adapter 50 (or other item connecting means) may have a different orientation relative to the casing member 20, as long as the position does not adversely affect the operation of the device 10, as described in more detail below. For example, the FIP adapter 50 may be oriented at a 45 degree angle relative to the base plate member 23b, rather than at a 90 degree angle relative to the base plate member 23b, as illustrated in FIG. 1 through FIG. 3B. In the illustrated embodiment, the FIP adapter 50 may be fabricated as a part of the base plate member 23b, which is the preferred means of fabrication, or it may be fabricated separately from the base plate member 23b and attached to the base plate member 23b by any suitable means, such as adhesives, epoxies, welding, fusing, nails, screws, clips, clamps, nuts, bolts, or other fasteners or combinations of such means.

Figure 13:
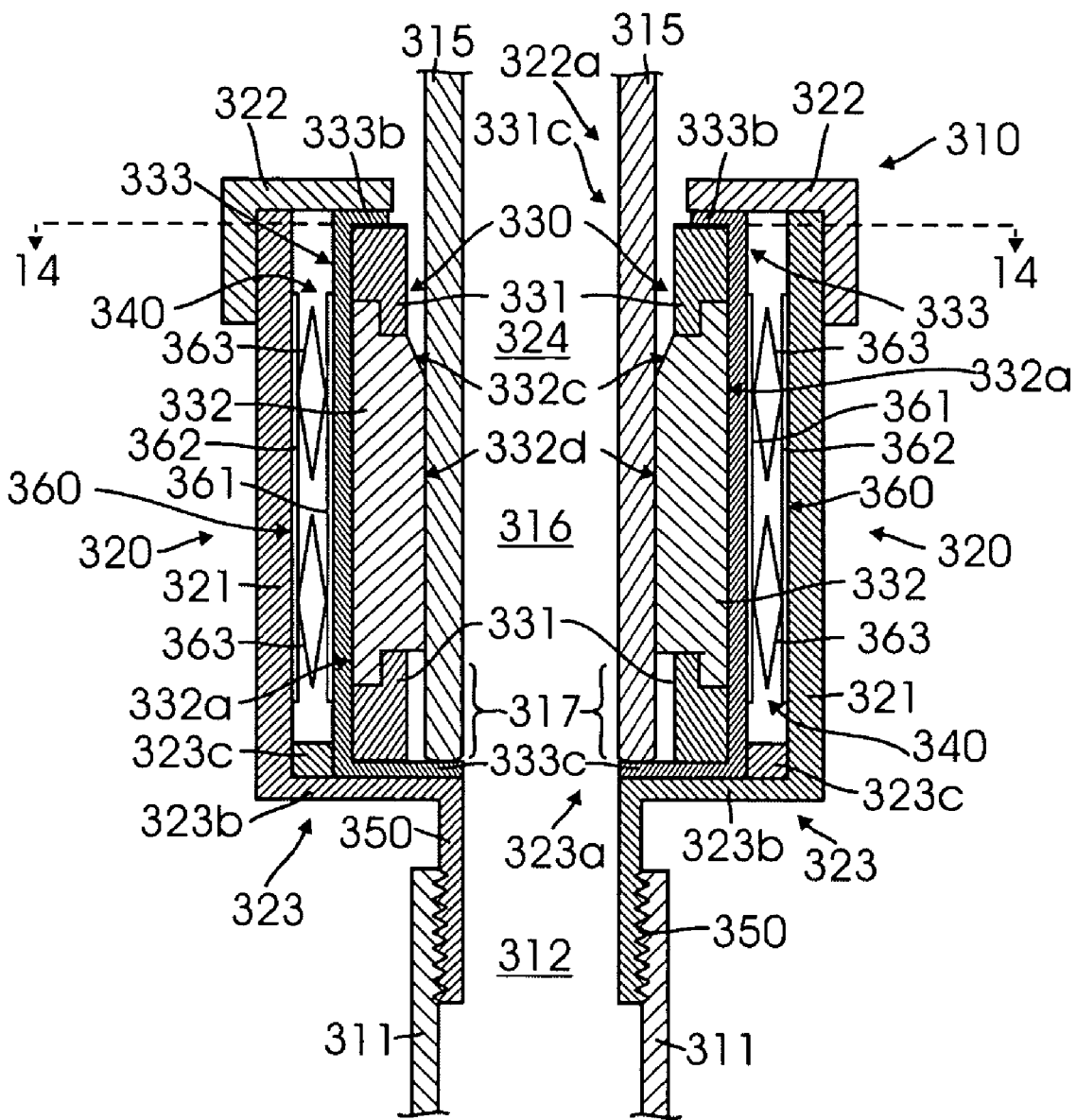
FIG. 13 is a sectional elevation view of another embodiment of a device of the present invention.

It is to be noted that in other embodiments of the present invention, the item connecting means (FIP adapter 50) may be comprised of almost any means that may be used for making a fluid-tight connection. For example, as illustrated in FIG. 13, the item connecting means may be comprised of a male iron pipe (MIP) adapter 350. As other examples, the item connecting means may be comprised of welding, fusing, adhesives, glues, epoxies, a garden hose connector, a connector having any of the thread types (male or female) described above with respect to the threaded end 17 of pipe 15, luer lock fittings, SWAGELOK® fittings, quick connect/disconnect fittings, hose barbs, stepped tubing connectors, bushings, flanges, compression fittings, tubing and hose connectors, SPEEDFIT® connectors, couplings for connection using clamps or adhesives, or other means or combinations of such means. In addition, the item connecting means may be comprised in whole or in part of a segment of conduit, tubing (including medical or food grade tubing), pipeline, duct, hose, channel, vent or other similar objects or combinations of such objects, as described above with respect to pipe 15, extending from a portion of the casing member 20. Alternatively, the item connecting means may incorporate any standard type of fitting, which may be fabricated as a part of or attached to the casing member 20. The item connecting means may also be used to connect the casing member 20 to the side wall of another pipe, such as may be the case with a sewer line tap. Further, the item connecting means may also be comprised in whole or in part of another device 10, of the same embodiment or a different embodiment, as device 10. For example, the case base 23 of the device 10 may also act as the case base for a different device (not illustrated), so that the combined device is comprised of two devices 10 joined back-to-back by the common case base 23. Further still, the item connecting means may be comprised in whole or in part of a tank, machine or item of equipment. For example, the item connecting means may be comprised of the case base 23 being a part of or affixed to the side wall of a tank (not illustrated), so that the device 10 connects the object (pipe 15) to the interior space of the tank (which would comprise the item in this embodiment). As another example, the base case 23 may be a part of or affixed to a panel on a piece of machinery or equipment (not illustrated), so that the device 10 connects the object (pipe 15) to the portion of the machinery that utilizes fluid supplied by the pipe 15. The preferred item connecting means for use with any particular embodiment of the device 10 depends upon a number of factors, such as the anticipated size or range of sizes of the object (pipe 15), the size and type of and materials comprising the item (pipe 11), the size of the internal member 30, the anticipated operating pressures of the device 10 (i.e., the pressures expected in the chamber 40), the anticipated operating or installation temperatures of the device 10, the desired wall thickness and materials comprising the case member 20, the use of mechanical compression means (described in more detail below), the type of internal member sealing means (described in more detail below) utilized in the device 10, the preferences of the user of the device 10, and other factors. More preferably, for an FIP adapter 50 comprised of polyvinyl chloride that is used to connect a pipe 11, the FIP adapter 50 is positioned and oriented as illustrated in FIG. 1 through FIG. 3B and is fabricated as a part of the case base 23.

In the embodiment of the device 10 illustrated in FIG. 1 through FIG. 3B, the case cap 22 is approximately cylindrical in shape and may be permanently or removably attached to the end of the case body 21 opposite the case base 23 by the case cap connecting means. In the illustrated embodiment, which is the preferred embodiment, the case cap connecting means is comprised of threads 21a on the outside surface of the portion of the case body 21 adjacent to the end of the case body 21 and corresponding threads 22b on the interior surface of the tubular portion of the case cap 22. Thus, the case cap 22 may be placed over the end of the case body 21, and may then be screwed down onto the case body 21. In this embodiment, the case cap 22 is further comprised of an o-ring 22c that is positioned within a groove in the case cap 22 and the end of the case body 21, so that when the case cap 22 is screwed onto the case body 21, the o-ring 22c provides a fluid tight seal between the case cap 22 and the case body 21. The case cap 22 also forms a fluid-tight seal with the internal member 30, so that the chamber 40 is formed between the interior surfaces of the case body 21, the case cap 22, and the case base 23, and the external surface of the internal member 30, as described in more detail herein. It is to be noted that in other embodiments the case cap 22 may have a different shape, as long as the case cap 22 cooperates with the case body 21 and the internal member 30 to form the chamber 40. Similarly, the object opening 22a may be of almost any size and shape, as long as it permits the formation of the chamber 40 and permits the casing member 20 to receive the object (pipe 15), which means that the pipe 15 may be inserted into the casing member 20 and the internal member 30. The case cap 22 may generally be comprised of any materials or combinations of materials that may be used to construct the case body 21, as described in detail above and illustrated in connection with FIG. 1 through FIG. 3B. Although the case cap 22 need not be constructed of the same material as the case body 21, the case cap 22 is preferably constructed of the same material. The case cap 22 may be fabricated using any suitable manufacturing means. For example, a case cap 22 comprised of PVC may be formed by injection molding.

In addition, the case cap connecting means may be comprised of means other than the illustrated threads 21a, 22b. For example, other case cap connecting means that may be used to removably connect the case cap 22 to the case body 21 may comprise clasps, clamps, clips, pins, hinges, other pivoting connectors or other types of connectors, either alone or in conjunction with one another in different combinations. Examples of case cap connecting means that may be used to permanently connect the case cap 22 to the case body 21 include adhesives, epoxies, welding, fusing, nails, screws, nuts, bolts, or other fasteners or combinations of such means. Where the case base 23 is removably connected to the case body 21, the case cap 22 may also be fabricated as a part of the case body 21. It is to be noted, however, that the case cap connecting means provides a fluid-tight seal between the case cap 22 and the case body 21 and between the case cap 22 and the internal member 30 in order to form the chamber 40, except in some cases where mechanical compression means are also utilized, as described in more detail below. For example, the fluid-tight seal may be inherent in the type of case cap connecting means used (such as welding or fusing), or it may be created in whole or in part by additional sealing means, such as the o-ring 22c, gaskets, flanges, washers, or other similar types of means or combinations of such means. The preferred characteristics of the case cap 22 and case cap connecting means are dependent upon a number of different factors, such as the anticipated shape and size or range of sizes of the object (pipe 15), the size and type of the item (pipe 11), the size and shape of the internal member 30, the anticipated operating pressures of the device 10 (i.e., the pressures expected in the chamber 40), the desired wall thickness and materials comprising the case body 20, the use of mechanical compression means (described in more detail below), the type of internal member sealing means (described in more detail below) utilized in the device 10, the preferences of the user of the device 10, and other factors. More preferred, the case cap 22 is generally of the shape illustrated in FIG. 1 and FIG. 2.

Figure 3A:
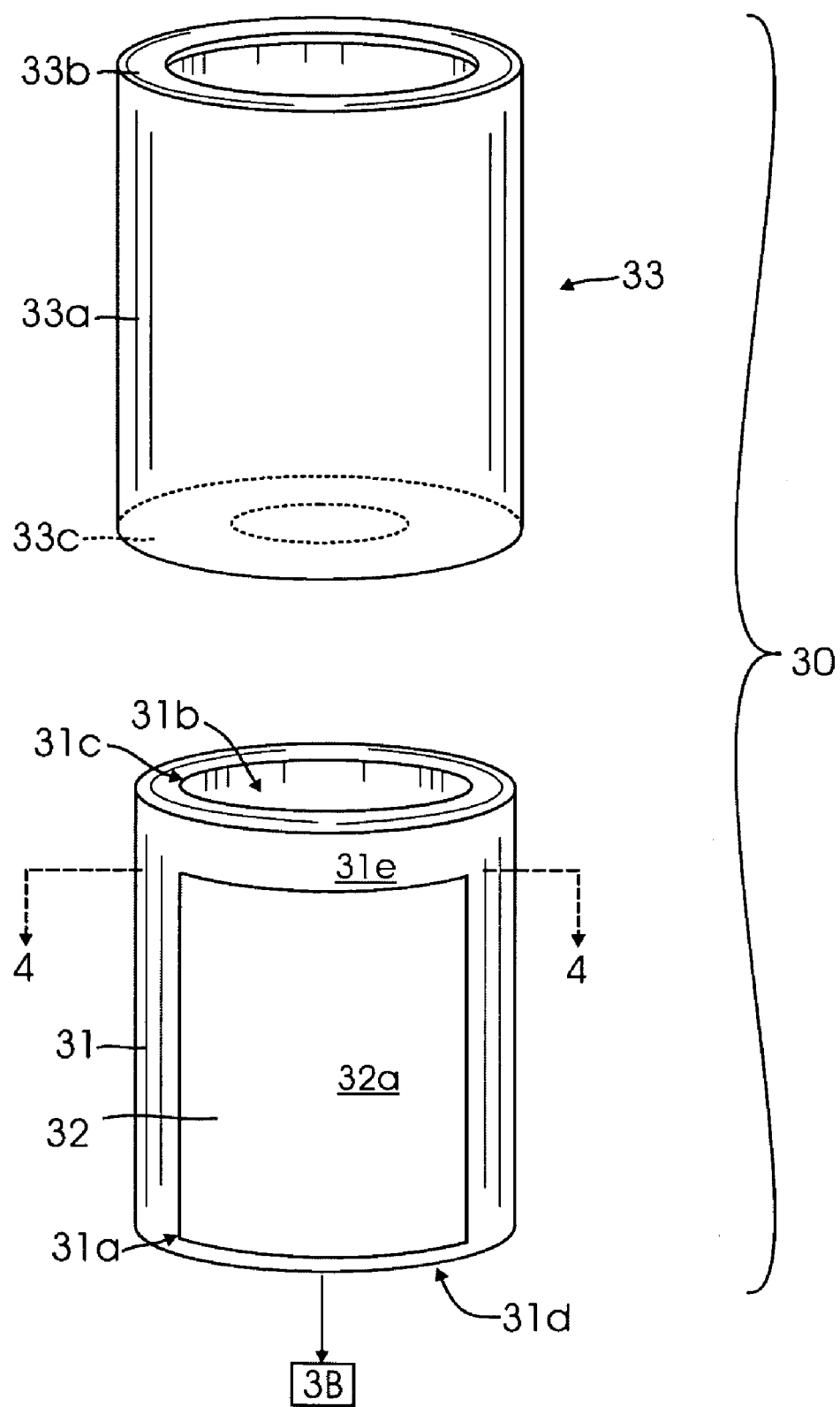
FIG. 3A and FIG. 3B are an exploded perspective view of the internal member, the sheath, and the casing member (except for the case cap) of the embodiment of the device of FIG. 1, as viewed from the side of and above the device.
Figures 3, 3B:
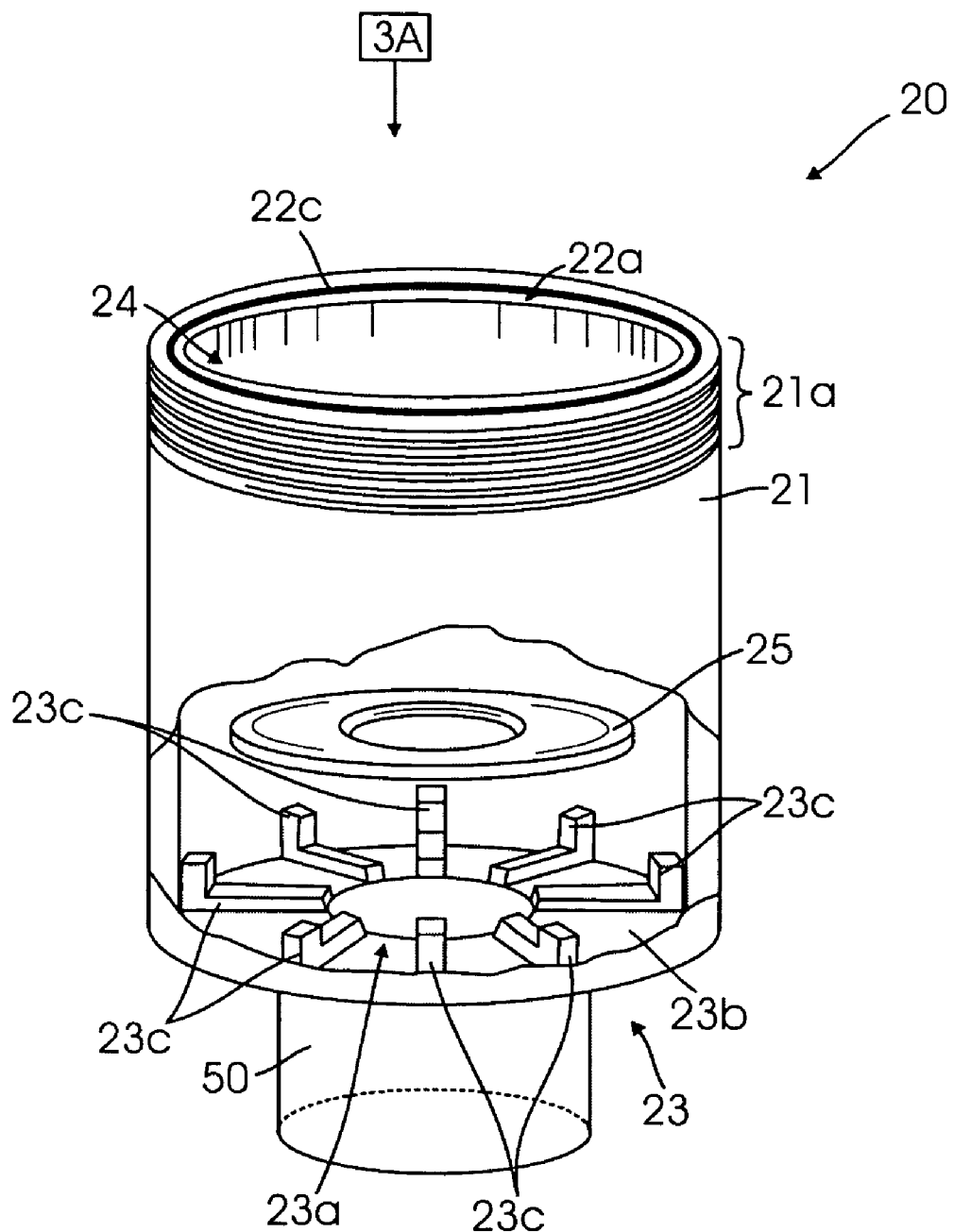
Figure 4:
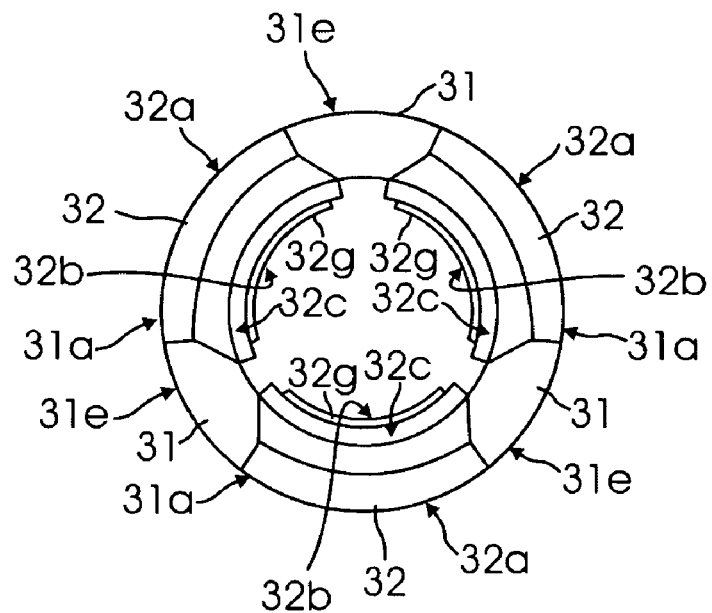
FIG. 4 is a sectional plan view of the embodiment of the internal member illustrated in FIG. 3A, as taken along the lines 4-4 in FIG. 3A.

As illustrated in FIG. 2 and FIG. 3A, the internal member 30 of the device 10 is positioned within the interior space 24 of the casing member 20. In the illustrated embodiment, the internal member 30 is generally comprised of a core member 31 and three tab members 32. In addition, the device 10 is comprised of internal member sealing means (described in more detail below) to seal the internal member 30 to the casing member 20 and the object (pipe 15) in a manner that creates the chamber 40. In the illustrated embodiment, the internal member sealing means is comprised of a sheath 33. Because the sheath 33 acts in conjunction with the internal member 30 in the illustrated embodiment, references to the internal member 30 herein include the sheath 33, except as otherwise noted herein. As illustrated in FIG. 3A, FIG. 4 (which is a sectional plan view of the core member 31 with the three tab members 32 in position), and FIG. 5 (which is a sectional plan view of the core member 31 with the three tab members 32 removed from the core member 31), the core member 31 is tubular in shape and has three tab openings 31$a$ positioned in the side walls of the core member 31. The core member 31 may have other shapes in other embodiments of the device 10, as long as the core member 31 has an interior space 31$b$ and an internal object opening 31$c$ and an internal item opening 31$d$ each adjoining the interior space 31$b$, wherein the internal object opening 31$c$ is of a size and shape adapted to receive the object (pipe 15) and the internal item opening 31$d$ permits the interior space 16 of the object (pipe 15) to be in fluid communication with the interior space 12 of the item (pipe 11). In addition, the core member 31 is of a shape capable of forming the chamber 40, as described in more detail elsewhere herein, except where mechanical compression means may be utilized, as described in more detail below. As an example of an alternate shape, all or a portion of the core member 31 may be hexagonal in shape when viewed from above an end of the core member 31. As other examples, the core member 31 may have a shape that is approximately ellipsoidal, triangular, square, rectangular, pentagonal, another polygonal shape, other shapes having arcuate or linear portions, or another shape or combination of such shapes, as long as the internal member 30 cooperates with the casing member 20 in operation of the device 10, as described in more detail below.

The preferred size and shape of the core member 31 is dependent upon a number of factors, such as the anticipated shape and size or range of sizes of the object (pipe 15), the size and other characteristics of the item (pipe 11), the size and other characteristics of the casing member 20, the anticipated operating pressures of the device 10 (i.e., the pressures expected in the chamber 40), the materials comprising the core member 31, the type of internal member sealing means (described in more detail below) utilized in the device 10, the use of mechanical compression means (described in more detail below), the characteristics of the tab members 32, the preferences of the user of the device 10, and other factors. The wall thickness of the core member 31 is generally dependent upon the same types of factors. In addition, the core member 31 may generally be comprised of the same types of materials or combinations of materials that may be used in construction of the case body 21, as described in more detail above and illustrated in connection with FIG. 1 through FIG. 3B. The preferred material is dependent upon a number of different factors, which are substantially similar to the factors involved in determining the preferred size and shape of the casing member 20, as described above, along with the anticipated operating and installation temperatures for the device 10. The core member 31 may be fabricated using any suitable means. For example, a core member 31 constructed of PVC may be formed by injection molding.

In the illustrated embodiment, the core member 31 has three tab openings 31$a$. In other embodiments of the core member 31, there may be two tab openings 31$a$ or more than three tab openings 31$a$, depending upon the number of tab members 32 to be utilized. The number of tab openings 31$a$ generally coincides with the number of tab members 32, so that each tab member 32 is positioned into one tab opening 31$a$ in the core member 31. Preferably, each tab member 32 is adapted to be of a size and shape so that its outer edges and surfaces fit snuggly against the internal edges and surfaces of the corresponding tab opening 31$a$. This allows the tab member 32 to move (or slide) smoothly into and out of the core member 31 in a controlled direction while the tab member 32 is supported by all or a portion of the interior surfaces of the corresponding tab opening 31$a$. In addition, each tab member 32 is preferably of a size and shape so that the exterior surface 31$e$ of the core member 31 is homogeneous. For example, when the tab members 32 are positioned in the core member 31, as best illustrated in FIG. 3A and FIG. 4, the outside surfaces 32$a$ of the tab members 32 are flush with the exterior surface 31$e$ of the core member 31, so that the core member 31 has a smooth, homogeneous cylindrical shape when viewed from the outside. The preferred shape of the tab openings 31$a$ is that illustrated in FIG. 3A, FIG. 4, and FIG. 5. Further, the tab openings 31$a$ are generally positioned in the side wall of the core member 31 in locations that enable the tab members 32 to effectively engage the object (pipe 15). For example, in the illustrated embodiment, the tab openings 31$a$ are placed close enough to the internal item opening 31$d$ so that ridges 32$g$ (described in more detail below) of the tab members 32 are able to contact the threads on the threaded end 17 of the pipe 15.

Figure 6:
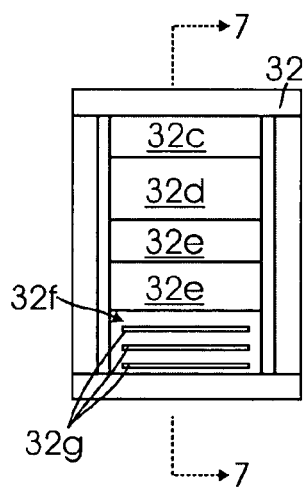
FIG. 6 is an elevation view of the interior surface of one of the tab members illustrated in FIG. 4 and FIG. 5, as taken along the lines 6-6 in FIG. 5.
Figure 7:
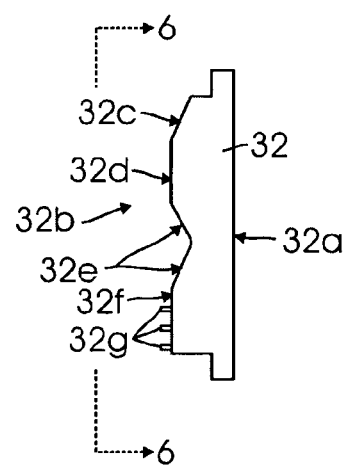
FIG. 7 is a sectional view of one of the tab members illustrated in FIG. 4 and FIG. 5, as taken along the lines 7-7 in FIG. 5 and FIG. 6.
Figure 5:
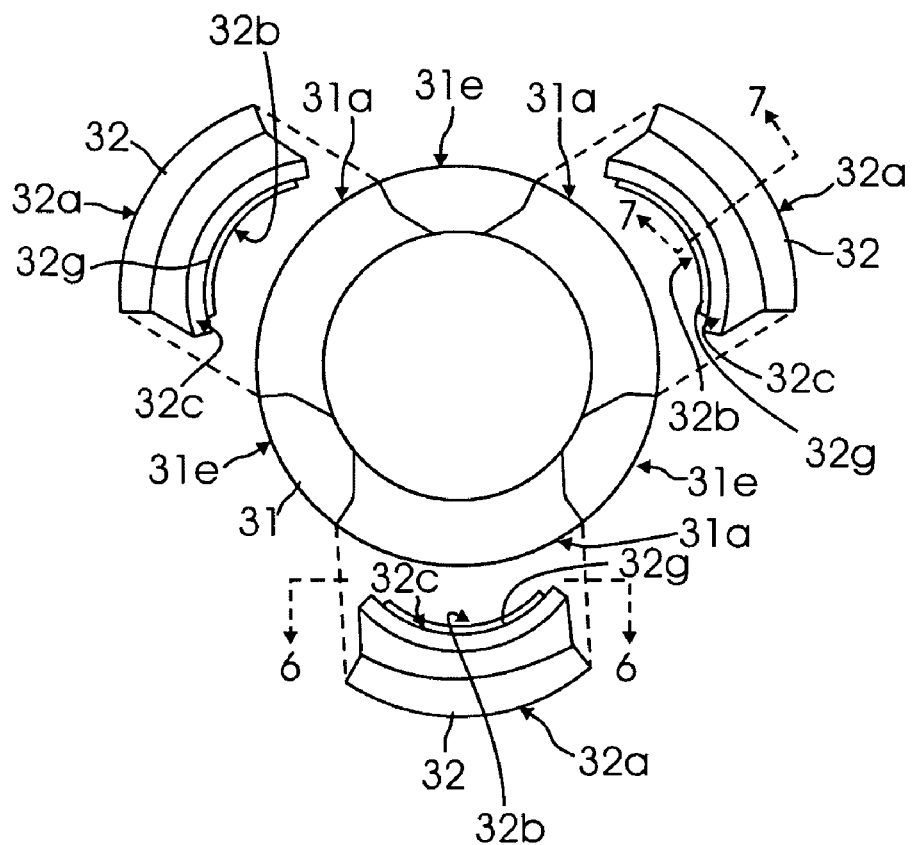
FIG. 5 is a sectional plan view of the embodiment of the internal member illustrated in FIG. 3A, as taken along the lines 44 in FIG. 3A, with the tab members displaced radially outward away from the core member.

As illustrated in FIG. 1, FIG. 4 and FIG. 5, this embodiment of the device 10 has three tab members 32. It is to be noted that in other embodiments, the device 10 may have only two tab members 32, while in other embodiments there may be more than three tab members 32. Each tab member 32 is slideably positioned in a tab opening 31$a$ of the core member 31. The preferred number of tab members 32 is dependent upon a number of factors, such as the anticipated size (or range of sizes) and shape of the object (pipe 15), the characteristic features (such as threads) of the end 17 of the object (pipe 15), the size and shape of the core member 31, the anticipated operating pressures of the device 10 (i.e., the pressures expected in the chamber 40), the desired characteristics of the tab members 32, the use of mechanical compression means (described in more detail below), the type of internal member sealing means (described in more detail below) utilized in the device 10, the preferences of the user of the device 10, and other factors. More preferably, the core member 31 may have at least three, but no more than ten, tab openings 31$a$, and the internal member 30 may be comprised of at least three, but no more than ten, tab members 32. Most preferably, in the case of a cylindrically shaped object (such as pipe 15), the device 10 utilizes three tab members 32 spaced an equal distance apart, as illustrated in FIG. 4 and FIG. 5. A more detailed view of the tab members 32 of this embodiment is illustrated in FIG. 6 (which is an elevation view of the interior surface 32$b$ of the tab members 32) and FIG. 7 (which is a sectional elevation view of the tab members 32). It is to be noted that the view of the tab member 32 in FIG. 7 is substantially the same as the view of the right hand tab member 32 in FIG. 1. (Some of the item numbers related to the details of the internal member 30 have been eliminated from FIG. 1 to avoid an excessive volume of item numbers in FIG. 1.) In the illustrated embodiment, the interior surface 32b of the tab member 32 extends into the interior space 31b of the core member 31. At the upper-most portion of its interior surface 32b (in the orientation presented in FIG. 6 and FIG. 7), each tab member 32 has a tapered surface 32c that generally extends from the interior side wall of the core member 31 to a contacting surface 32d of the tab member 32 that is positioned within the interior space 31b of the core member 31. The contacting surface 32d is approximately parallel to the outer surface of the pipe 15 along the longitudinal axis of the core member 31. The contacting surface 32d is also adapted to be of a size and shape to conform to the outside surface of the pipe 15 around the circumference of the pipe 15 in the range of potential sizes and shapes of the pipe 15. In the illustrated embodiment, below the contacting surface 32d there is an indentation 32e. Below the indentation 32e there is a secondary contacting surface 32f. The secondary contacting surface 32f is also approximately parallel to the outer surface of the pipe 15 along the longitudinal axis of the core member 31, and is adapted to be of a size and shape to conform to the outside surface of the pipe 15 around the circumference of the pipe 15 in the range of potential sizes and shapes of the pipe 15. In this embodiment, the indentation 32e may be used to reduce the weight of the device 10, as well as the amount of material necessary to fabricate the tab members 32. In other embodiments of the device 10, the indentation 32e may not be present, so that the contacting surface 32d and the secondary contacting surface 32f constitute a single contacting surface 332d, as illustrated in FIG. 13.

Referring again to FIG. 6 and FIG. 7, in still other embodiments, the tab members 32 may be smaller than as illustrated. For example, the tab members 32 may each have a secondary contacting surface 32f and a tapered surface (such as the lower half of indentation 32e), but not a contacting surface 32d, so that the tab members 32 consist only of the lower portion of the tab member 32 illustrated in FIG. 6 and FIG. 7. In yet other embodiments, one or more of the tab members 32 may have other shapes. For example, when viewed from above their exterior surfaces 32a, the tab members 32 may have an elliptical, circular, square, triangular, polygonal or other shape or combination of such shapes. As another example, when viewed from above the top surface (as illustrated in FIG. 4 and FIG. 5), the interior surface 32b of one or more of the tab members 32 may have one or more linear contours, one or more arcuate contours, or a combination of linear and arcuate contours, rather than the approximately circular contour illustrated. Similarly, the other surfaces of one or more of the tab members 32, as viewed from above the tab members 32, as illustrated in FIG. 4 and FIG. 5, may have one or more linear contours, one or more arcuate contours, or a combination of linear and arcuate contours, rather than the combination of linear and arcuate contours illustrated. As yet another example, the shape of the interior surface 32b of the tab members 32, as viewed from the perspective illustrated in FIG. 7, may also have one or more linear contours, one or more arcuate contours, or a combination of linear and arcuate contours, rather than the combination of linear contours illustrated. It is to be noted that in some embodiments the tab members 32 may actually be comprised of two separate pieces. This may be the case, for example, where the tab members 32 are comprised of an upper portion, which is the portion of the tab member 32 above the midpoint of the indentation 32e, and a lower portion, which is the portion of the tab member 32 below the mid-point of the indentation 32e. In this case, the upper portions and lower portions of the tab members 32 may move in the same slideable manner as the single piece tab members 32, but may also move relative to one another.

The preferred sizes, shapes and positioning of the tab members 32 is dependent upon a number of factors, such as the anticipated size (or range of sizes) and shape of the object (pipe 15), the characteristic features (such as threads) of the end 17 of the object (pipe 15), the size and shape of the core member 31, the anticipated operating pressures of the device 10 (i.e., the pressures expected in the chamber 40), the desired characteristics of the tab members 32, the use of mechanical compression means (described in more detail below), the type of internal member sealing means (described in more detail below) utilized in the device 10, the preferences of the user of the device 10, and other factors. More preferably, in the case of a cylindrically shaped object (such as pipe 15), the device 10 utilizes three tab members 32 having the approximate shape and relative size illustrated in FIG. 4 through FIG. 7. It is also to be noted that the object (pipe 15) may be in physical contact with only the secondary contacting surface 32f, as illustrated in FIG. 1, or the object (pipe 15) may be in physical contact with both the contacting surface 32d and the secondary contacting surface 32f, as described below and illustrated in connection with FIG. 10, where the object (pipe 115) is in physical contact with both the contacting surface 132d and the secondary contacting surface 132f. Referring again to FIG. 4 through FIG. 7, it is to be further noted that all of the tab members 32 may be of the same shape and size, which is the preferred embodiment, or the tab members 32 may be of different shapes and sizes. In addition, the tab members 32 may generally be comprised of the same types of materials or combinations of materials that may be used in construction of the case body 21, as described in more detail above and illustrated in connection with FIG. 1 through FIG. 3B. The preferred material is dependent upon a number of different factors, which are substantially similar to the factors involved in determining the preferred size and shape of the tab members 32, as described above, along with the anticipated operating and installation temperatures for the device 10. The tab members 32 may be fabricated using any suitable means. For example, a tab member 32 constructed of PVC may be formed by injection molding.

In the embodiment of the tab members 32 illustrated in FIG. 2 and FIG. 4 through FIG. 7, the tab members 32 also each comprise gripping means that enhance the ability of the tab members 32 to hold the object (pipe 15) in place relative to the tab members 32 (and therefore the internal member 30 and the device 10) by friction. In the illustrated embodiment, the gripping means is comprised of three ridges 32g positioned on the secondary contacting surface 32f. The ridges 32g extend into the spaces between the threads on the threaded end 17 of the pipe 15. When pressure is exerted radially inward on the tab members 32, as described in more detail below, the ridges 32g are pressed against the pipe 15, and the surfaces of the threads on the threaded end 17 adjacent to the ridges 32g act as an additional barrier to movement of the pipe 15 relative to the tab members 32 (and thus the internal member 30). In the illustrated embodiment, the ridges 32g have a cross-sectional shape that is approximately rectangular. In other embodiments, however, the ridges 32g may have a different cross-sectional shape. For example, one or more of the ridges 32g may have shapes that are approximately parabolic, hyperbolic, circular, triangular, polygonal, or having linear or arcuate (or both) segments or contours, or other shapes or combinations of such shapes. In addition, in other embodiments, there may be fewer (one or two) ridges 32g or more than three ridges 32g or no ridges 32g at all. Further still, the ridges 32g may be positioned on other surfaces of the tab members 32, such as the contacting surface 32d or the indentation 32e. Similarly, the spacing between the ridges 32g may vary in different embodiments. Thus, the ridges 32g may be spaced an equal distance apart along the longitudinal axis of the core member 31, or they may be spaced different distances apart. Alternatively, or in addition, the ridges 32g may all be in alignment when viewed from above (as illustrated in FIG. 4 and FIG. 5), or they may be offset when viewed from that perspective. Further, the ridges 32g may be substantially in the form of threads that correspond to the threads on the end 17 of the object (pipe 15). In other embodiments, the gripping means may take yet other forms in lieu of or in addition to one or more ridges 32g. For example, the gripping means may take the form of a gritted surface (not illustrated) that is positioned on all or a portion of the interior surface 32b of one or more of the tab members 32. Such gritted surface may have the texture of emery cloth, sandpaper, or another type of uneven surface designed to increase friction. The gritted surface may be constructed as a part of the tab member 32, or it may be a separate member, such as a piece of emery cloth, that is attached to the desired portion of the interior surface 32b of the tab member 32 by an adhesive or other attaching or fastening means. As other examples, the gripping means may be comprised in whole or in part of irregular surface contours of the tab member 32, magnets, adhesives, hook and loop fasteners (VELCRO), or other means or combinations of such means. The preferred type of gripping means to be used with the tab members 32 is dependent upon a number of factors, such as the anticipated size (or range of sizes), shape and surface characteristics of the object (pipe 15), the characteristic features (such as threads) of the end 17 of the object (pipe 15), the size and shape of the core member 31, the anticipated operating pressure of the device 10 (i.e., the pressures expected in the chamber 40), the other desired characteristics of the tab members 32, the use of mechanical compression means (described in more detail below), the type of internal member sealing means (described in more detail below) utilized in the device 10, the preferences of the user of the device 10, and other factors. More preferably, in the case of a cylindrically shaped object (such as pipe 15), the tab members 32 each utilize at least one ridge 32g on the secondary contacting surface 32f and a gritted surface on the contacting surface 32d. Even more preferably, the tab members 32 each utilize at least one ridge 32g, but no more than three ridges 32g, on the secondary contacting surface 32f. Most preferred, the tab members 32 each utilize one ridge 32g on the secondary contacting surface 32f. In addition, each tab member 32 preferably utilizes the same gripping means, but each tab member 32 may utilize a different gripping means in various embodiments of the device 10.

The embodiment of the present invention illustrated in FIG. 2 and FIG. 3A also comprises internal member sealing means to seal the internal member 30 to the casing member 20 and the object (pipe 15) in a manner that creates the chamber 40 in the space bounded by the casing member 20, the internal member 30, and the object (pipe 15), wherein the space within the chamber 40 is in fluid communication with the interior space 16 of the object (pipe 15) and the interior space 12 of the item (pipe 11). In the embodiment of the device 10 illustrated in FIG. 2 and FIG. 3A, the internal member sealing means is comprised of the sheath 33. In this embodiment, the sheath 33 is comprised of a semi-flexible material that is compatible with the type of fluid anticipated in the interior space 16 of the object (pipe 15) and thus, anticipated in the chamber 40. For example, the sheath 33 may be comprised of rubber (including neoprene), another semi-flexible polymer, cloth, fabric or another semi-flexible material or combinations of such materials. The sheath 33 is further comprised of a tubular portion 33a, a cap sealing portion 33b positioned approximately adjacent to the internal object opening 31c of the core member 31, and a base sealing portion 33c positioned approximately adjacent to the internal item opening 31d of the core member 31. The base sealing portion 33c also comprises object sealing means, which are described in more detail below. The sheath 33 is adapted to be of a size and shape so that it fits over and is positioned adjacent to all or a portion of the exterior surface 31e (including the exterior surfaces 32a of the tab members 32) of the core member 31. In the illustrated embodiment, the tab members 32 are placed in position in the tab openings 31a of the core member 31. The cap sealing portion 33b of the sheath 33 may then be placed adjacent to the end of the core member 31 having the internal item opening 31d. The sheath 33 may then be deformed slightly, and pulled up and over the exterior surface 31e (including the exterior surfaces 32a of the tab members 32) of the core member 31 along the length of the core member 31 until the cap sealing portion 33b of the sheath 33 snaps into place on the top end surface of the core member 31 adjacent to the internal object opening 31c of the core member 31. The semi-flexible nature of the sheath 33 allows it to be deformed in this way. When the case sealing portion 33b of the sheath 33 snaps into position on the core member 31, the base sealing portion 33c of the sheath 33 is adjacent to the end surface of the core member 31 that is adjacent to the internal item opening 31d of the core member 31. In addition, when the sheath 33 is in position on the core member 31, the tab members 32 are held in position in the tab openings 31a in the core member 31 by the sheath 33. The internal member 30 (comprising the tab members 32, the core member 31, and the sheath 33) is then positioned within the casing member 20. In this embodiment, the internal item opening 31d, and thus the base sealing portion 33c of the sheath 33, of the internal member 30 is placed adjacent to the flange member 25. The case cap 22 is then removably or permanently connected to the case body 21 by the case cap connecting means in a manner that creates a fluid-tight seal between the internal member 30 and the casing member 20. In this embodiment, the case cap 22 is placed over the end of the case body 22 and is screwed down on the case body 21 until a fluid-tight seal is achieved between the case cap 22 and the case body 21 by the case cap connecting means (o-ring 22c). The length of the core member 31, the thickness of the cap sealing portion 33b, and the thickness of the base sealing portion 33c are adapted so that when the case cap 22 is in position on the case body 21, the cap sealing portion 33b is compressed between the case cap 22 and the end of the core member 31 adjacent to the internal object opening 31c, and the base sealing portion 33c is compressed between the case base 23 (the flange member 25) and the end of the core member 31 adjacent to the internal item opening 31d. Thus, the cap sealing portion 33b and the base sealing portion 33c of the sheath 33 act as gaskets, sealing the internal member 30 to the casing member 20 in a manner so that the fluid-tight chamber 40 is formed in the space bounded by the casing member 20 and the internal member 30, except for the spaces bounded by the base support members 23c, the base plate member 23a, and the flange member 25. The thickness of the tubular portion 33a is adapted so that when the maximum size of object (pipe 15) is inserted into the interior space 31b of the internal member 30, the tab members 32 are displaced radially away from the pipe 15 into the space within the chamber 40 (as described in more detail below) and the sheath 33, including the tubular portion 33a, retains its structural integrity and exerts a force radially inward that serves to hold the tab members 32 in position in the tab openings 31a of the core member 31. All or a portion of the sheath 33 may also be held in place relative to the core member 31 by means of an adhesive, adhesive tape, epoxy, clamp, clip, screw, nail, pin, clasp, bolt, nut, magnet, or other means or combination of such means.

Figures 8, 9:
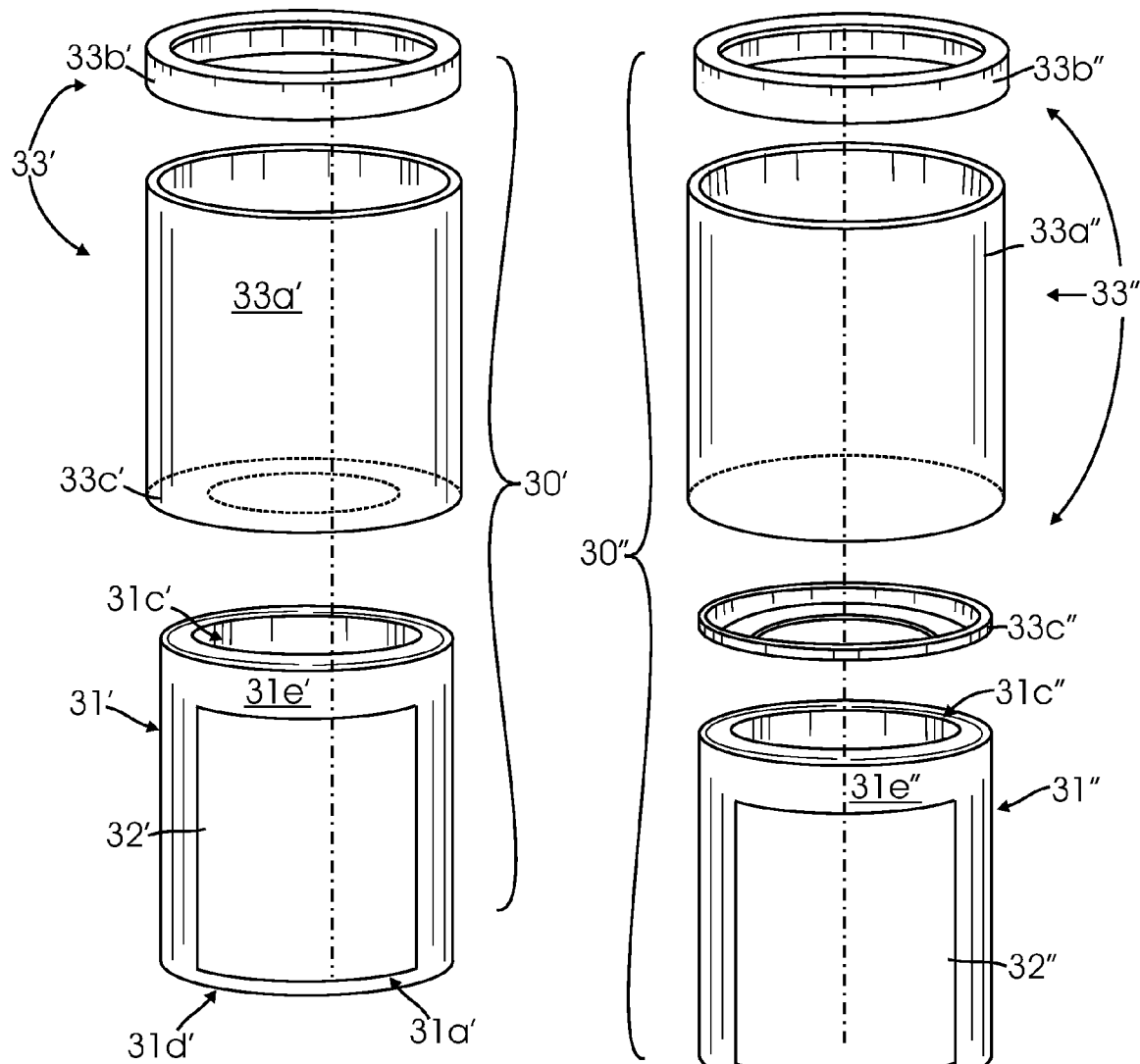
FIG. 8 is an exploded perspective view of an alternative embodiment of the internal member, as viewed from the side of and above the internal member and covering the sealing members.
FIG. 9 is an exploded perspective view of another alternative embodiment of the internal member, as viewed from the side of and above the internal member and the covering sealing members.

In other embodiments of the present invention, the sheath 33 may have a different shape than that illustrated in FIG. 2 and FIG. 3A. Generally, the sheath 33 may have almost any shape, as long as it provides, at least in part, the internal member sealing means and permits the internal object opening 31c and the internal item opening 31d of the internal member 30 to be maintained. Preferably, the sheath 33 also serves, at least in part, to hold the tab members 32 in place in the tab openings 31a of the core member 31. As a result, it is also preferred that the sheath 33 generally conform in size and shape to at least a portion of the exterior surface 31e (including the exterior surfaces 32a of the tab members 32) of the core member 31. It is to be noted, however, that the sheath 33 may not need to hold the tab members 32 in place in the tab openings 31a in embodiments utilizing mechanical compression means, as described in more detail below. In addition, the internal member sealing means, and the sheath 33, may be comprised of more than one component or member in other embodiments. For example, as illustrated in FIG. 8, the sheath 33' may be comprised of two components. The first component is an upper sealing member 33b' that is positioned on the end of the core member 31' adjacent to the internal object opening 31c'. The upper sealing member 33b' serves to provide a fluid-tight seal between the core member 31' and the case cap (not illustrated) in substantially the same manner as the upper sealing portion 33b of the sheath 33, as described above and illustrated in connection with FIG. 2 and FIG. 3A. Referring again to FIG. 8, the upper sealing member 33b' may be held in place on the core member 31' by friction (where the upper sealing member 33b' fits tightly against the side wall of the core member 31') or it may be held in place by an adhesive, adhesive tape, epoxy, clamp, clip, screw, nail, pin, clasp, bolt, nut, magnet or other means or combination of such means. In yet other embodiments, the upper sealing member 33b' may be of a shape so that it is positioned adjacent only to the end portion of the core member 31' adjacent to the internal object opening 31c', and not adjacent to any portion of the side wall of the core member 31'. For example, the upper sealing member 33b' may also be comprised of a flat gasket, o-ring, washer or similar means or a combination of such means.

The second component of the sheath 33' is comprised of a sheath tubular portion 33a' and a base sealing portion 33c'. The base sealing portion 33c' serves to provide a fluid-tight seal between the core member 31' and the case base (not illustrated) in substantially the same manner as the base sealing portion 33c of the sheath 33, as described above and illustrated in connection with FIG. 2 and FIG. 3A. The base sealing portion 33c' also comprises object sealing means, which are described in more detail below. The tubular portion 33a' serves to hold the tab members 32' in place in the tab openings 31a' in substantially the same manner as the tubular portion 33a of sheath 33, as described above and illustrated in connection with FIG. 2 and FIG. 3A. In addition, the tubular portion 33a' serves to seal the tab openings 31a' in a fluid-tight manner. For example, the tubular portion 33a' may be sealed to the core member 31' around the perimeter of the exterior surface 31e' of the core member 31' above the tab openings 31a by any appropriate means, such as an adhesive, adhesive tape, epoxy, clamp, clip, screw, nail, pin, clasp, bolt, nut, magnet or other means or combination of such means. As a result, the combination of the fluid-tight seals created by the upper sealing member 33b' to the case cap, the base sealing portion 33c' to the case base, and the tubular portion 33a' to the core member 31', creates a chamber (not illustrated) in substantially the same manner as the sheath 33, as described above and illustrated in connection with FIG. 2 and FIG. 3A. The use of a sheath 33' comprised of multiple components in this manner may serve to make manufacturing of the device 10 easier and less expensive, especially where the shape of the core member 31 does not allow for a single piece sheath 33 to be pulled over the core member 31, as described above and illustrated in connection with FIG. 2 and FIG. 3A.

Another example of a multiple-component internal member sealing means (and sheath 33") is illustrated in FIG. 9. In this embodiment, the sheath 33" is comprised of a tubular member 33a", an upper sealing member 33b", and a lower sealing member 33c". The upper sealing member 33b" may have substantially the same structure, features, characteristics and operation as the embodiments of the upper sealing member 33a' described above and illustrated in connection with FIG. 8. The lower sealing member 33c" serves to provide a fluid-tight seal between the core member 31" and the case base (not illustrated) in substantially the same manner as the base sealing portion 33c' of the sheath 33', as described above and illustrated in connection with FIG. 8. The lower sealing member 33c" also comprises object sealing means, which are described in more detail below. In yet other embodiments, the lower sealing member 33c" may be of a shape so that it is positioned adjacent only to the end portion of the core member 31" adjacent to the internal item opening 31d", and not adjacent to any portion of the side wall of the core member 31". The lower sealing member 33c" may also be sealed to the core member 31" around its perimeter by any appropriate means to provide a fluid-tight seal between the lower sealing member 33c" and the core member 31". Examples of such means includes adhesive, adhesive tape, epoxy, clamp, clip, screw, nail, pin, clasp, bolt, nut, magnet or other means or combination of such means. The tubular member 33a" serves to hold the tab members 32" in place in the tab openings 31a" in substantially the same manner as the tubular portion 33a' of sheath 33', as described above and illustrated in connection with FIG. 8. In addition, the tubular portion 33a" serves to seal the tab openings 31a" in a fluid-tight manner. For example, the tubular portion 33a" is sealed to the core member 31" around the perimeter of the exterior surface 31e" of the core member 31" at both ends of the core member 31" approximately adjacent to the internal object opening 31c" and the internal item opening 31d". This fluid-tight seal may be accomplished using any appropriate means, such as adhesive, adhesive tape, epoxy, clamps, clips, screws, nails, pins, clasps, bolts, nuts, magnets, or other means or combination of such means. As a result, the combination of the fluid-tight seals created by the upper sealing member 33b" to the case cap (not illustrated), the lower sealing member 33c" to the case base (not illustrated), and the tubular portion 33a" to the core member 31", creates a chamber (not illustrated) in substantially the same manner as the sheath 33, as described above and illustrated in connection with FIG. 2 and FIG. 3A. In the embodiment of the internal member 30" illustrated in FIG. 9, the internal member 30" may be constructed by positioning the upper sealing member 33b" on, and sealing it to, the core member 31", positioning the tab members 32" in their respective tab openings 31a" and positioning the tubular member 33a" over, and sealing it to, the core member 31', and then positioning the lower sealing member 33c" on, and sealing it to, the core member 31". These steps may also be performed in a different order. It is to be noted that in other embodiments, the core member 31 may be sealed directly to the case cap 22 or the case base 23 or both using any appropriate means, such as adhesive, adhesive tape, epoxy, clamps, clips, screws, nails, pins, clasps, bolts, nuts, magnets, or other means or combination of such means.

Referring again to FIG. 2 through FIG. 7, the device 10 operates in the following manner. First, the threaded end 17 of the object (pipe 15) is inserted into (and received by) the object opening 22a of the casing member 20 and the internal object opening 31c of the internal member 30. In this embodiment, the object (pipe 15) has a generally cylindrical shape and an outside diameter within a predetermined range. For example, the pipe 15 in some embodiments may have an outside diameter within the range of 1.05 inches to 1.32 inches. In addition, the pipe 15 may have a variety of different thread types on its end 17, as described in more detail above and illustrated in connection with FIG. 1 and FIG. 2. Thus, the device 10 is capable of connecting to a variety of different types and sizes of pipes 15. As the pipe 15 is being inserted into (and received by) the device 10, if the outside diameter of the pipe 15 is the minimum acceptable diameter of the pipe 15, the distal end 17 of the pipe 15 may travel down the longitudinal axis of the internal member 30 with only minimal contact against or no contact against the tab members 32 until the distal end 17 of the pipe 15 abuts the ridges 32g of the tab members 32 closest to the object opening 22a of the device 10. The pipe 15 may then be rotated so that the threads on the threaded end 17 of the pipe 15 engage the ridges 32g on the tab members 32. As the pipe 15 is rotated (in a clockwise manner for standard NPT threads), the pipe 15 is drawn toward the item opening 23a of the device 10 by the ridges 32g acting in the same manner as would be the case with corresponding threads on a receiving fitting. The pipe 15 is rotated in this manner until the distal end 17 of the pipe 15 makes contact with and is permanently or removably sealed to the device 10 by the object sealing means, which are described in more detail below.

Continuing to refer to FIG. 2 through FIG. 7, after the object sealing means has been used to seal the object (pipe 15) to the device 10, and the item (pipe 11) has been connected to the casing member 20 using the item connecting means (FIP adapter 50), fluids may be transmitted from the interior space 16 of the pipe 15 to the interior space 12 of the pipe 11, or vice versa, in a manner that provides a fluid-tight seal between the pipes 15, 11. When there is little resistance to the flow of fluids in the pipes 11, 15, there is not a relatively great pressure (or thrust) loading along the longitudinal axis of the device 10 tending to pull the device 10 from the pipe 15. As pressure builds within the interior space 12, 16 of the pipes 11, 15, respectively, such as when a valve (not illustrated) is closed on the pipe 11 (when flow is from pipe 15 to pipe 11), the thrust loading along the longitudinal axes of the pipe 15 and the device 10 also increases. As the pressure in the interior space 12, 16 of the pipes 11, 15, respectively, increases, the increasing fluid pressure is also transmitted to the chamber 40 as fluid flows or is compressed into the chamber 40 through the spaces bounded by the flange member 25, the base plate member 23b, and the base support members 23c. As the pressure builds in the chamber 40, increasing pressure is also exerted against the sheath 33. The increasing pressure on the sheath 33 produces a radially inward force against the tab members 32, which, in conjunction with the gripping means (the ridges 32g in this embodiment), holds the pipe 15 in place relative to the device 10 by friction. This radially inward force also assists the object sealing means (described in more detail below) in maintaining the fluid tight seal between the object (pipe 15) and the device 10 in spite of the increasing thrust load. Thus, as is apparent from the foregoing description, the preferred type of internal member sealing means, object sealing means, gripping means, item connecting means, and other structural characteristics of the device 10 are dependent upon numerous different factors. A device 10 having a particular combination of features appropriate for one type of operating condition may not be appropriate for other types of operating conditions.

Figure 10:
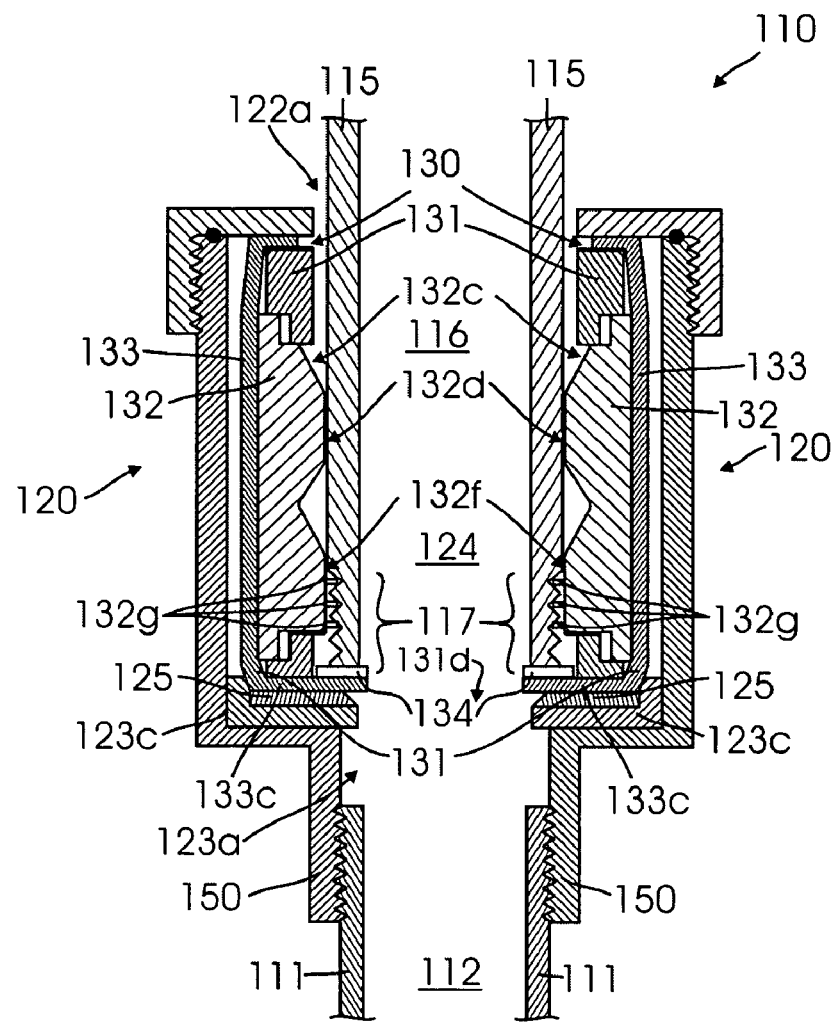
FIG. 10 is a sectional elevation view of the embodiment of the device of FIG. 1 and FIG. 2, except that an alternative object sealing means is illustrated, wherein the tab members and the sheath are displaced radially outward from the core member.

The device 110 illustrated in FIG. 10 is substantially the same as the embodiment of the device 10 described above and illustrated in connection with FIG. 1 through FIG. 7, except that the tab member 132 contacting surfaces 132d abut the pipe 115, and the device 110 has a different object sealing means (and therefore has a sheath 133 with a different shaped base sealing portion 133c) than the device 10. Referring to the device 110 illustrated in FIG. 10 as an example, if the pipe 115 has an outside diameter greater than the minimum acceptable diameter for objects to be used with the device 110 (in contrast to pipe 15 illustrated in FIG. 1 and FIG. 2), as the pipe 115 is inserted into (and received by) the device 110, the distal end 117 of the pipe 115 abuts the tapered surfaces 132c of the tab members 132. As the pipe 115 continues to be pressed into the device 110, the tab members 132 are displaced radially outward as the pipe 115 continues to travel along the longitudinal axis of the internal member 130 toward the item opening 123a of the device 110. As the tab members 132 are displaced radially outward, they are pressed against the sheath 133, which stretches and is also displaced radially outward from the core member 131 due to the semi-flexible nature of the sheath 133. It is to be noted that the inside and outside diameters of the core member 131, the inside diameter of the casing member 120, the size and shape of the tab members 132, and the thickness and flexibility of the sheath 133 are adapted so that when an object (pipe 15) of maximum allowable outside diameter is inserted into (and received by) the device 110, the tab members 132 may be displaced the required distance radially outward, while the tab members 132 continue to be held in place in the core member 131 by the sheath 133. When the distal end 117 of the pipe 115 reaches the contacting surfaces 132d of the tab members 132, the pipe 115 continues to slide along the contacting surfaces 132d and then moves alongside or adjacent to the secondary contacting surfaces 132f of the tab members 132 until the distal end 117 of the pipe 115 abuts the ridges 132g of the tab members 132 closest to the object opening 122a of the device 110. The pipe 115 may then be rotated so that the threads on the threaded end 117 of the pipe 115 engage the ridges 132g on the tab members 132. As the pipe 115 is rotated (in a clockwise manner for standard NPT threads), the pipe 115 is drawn toward the item opening 123a of the device 110 by the ridges 132g acting in the same manner as would be the case with corresponding threads on a receiving fitting. The pipe 115 is rotated in this manner until the distal end 117 of the pipe 115 makes contact with and is sealed to the device 110 by the object sealing means, which are described in more detail below. After the object sealing means (described in more detail below) have been used to seal the object (pipe 115) to the device 110, and the item (pipe 111) has been connected to the casing member 120 using the item connecting means (FIP connector 150), fluids may be transmitted from the interior space 116 of the pipe 115 to the interior space 112 of the pipe 111, or vice versa, in a manner that provides a fluid-tight seal between the pipes 115, 111. Thus, the device 110 operates in substantially the same manner as the device 10 described above and illustrated in connection with FIG. 1 through FIG. 7.

Referring again to FIG. 1 through FIG. 7, the internal member sealing means (which are comprised of the sheath 33 in this embodiment) of the device 10 also comprise object sealing means that are used to create a fluid-tight seal between the object (pipe 15) and the internal member 30 (which includes the sheath 33). In the illustrated embodiment, the object sealing means is comprised of the sheath 33, acting in conjunction with the flange member 25. In this embodiment, the flange member 25 has a tapered surface 25a across the thickness of its interior perimeter, while the base support members 23c have a surface across the thickness of their interior perimeter that is approximately perpendicular to the longitudinal axis of the casing member 20 and the internal member 30. The base sealing portion 33c of the sheath 33 extends into the internal item opening 31d of the core member 31 slightly beyond the interior diameter of the flange member 25. When the pipe 15 is rotated so that it moves toward the item opening 23a, the distal end 17 of the pipe 15 abuts the base sealing portion 33c of the sheath 33. As the pipe 15 continues to move toward the item opening 23a, the distal end 17 of the pipe 15 compresses the base sealing portion 33c of the sheath 33 against the flange member 25. Because of the semi-flexible nature of the sheath 33, a fluid-tight seal is formed between the pipe 15, the sheath 33, and the flange member 25. Thus, the internal member sealing means seals the internal member 30 to the casing member 20 and the object (pipe 15) in a manner that creates the fluid-tight chamber 40 in the space bounded by the casing member 20, the internal member 30, and the object (pipe 15), wherein the space within the fluid-tight chamber 40 is in fluid communication with the interior space 16 of the object (pipe 15) and the interior space 12 of the item (pipe 11). As the pressure in the interior space 16 of the object (pipe 15) and the interior space 12 of the item (pipe 11) increases, the pressure in the chamber 40 increases, forcing the tab members 32 radially inward so that the pipe 15 is held in place relative to the tab members 32 (and therefore the device 10) by friction, so that the seal is not broken between the pipe 15, the sheath 33, and the flange member 25. In order to enhance this type of seal, the base sealing portion 133c of the sheath 133 may be thicker than other portions of the sheath 133 or may be constructed of a more pliable material or both. As described in more detail below, this type of object sealing means may not be appropriate for higher operating pressures (that is, higher pressures within the interior space 16 of the object (pipe 15) and the interior space 12 of the item (pipe 11)).

Figure 11:
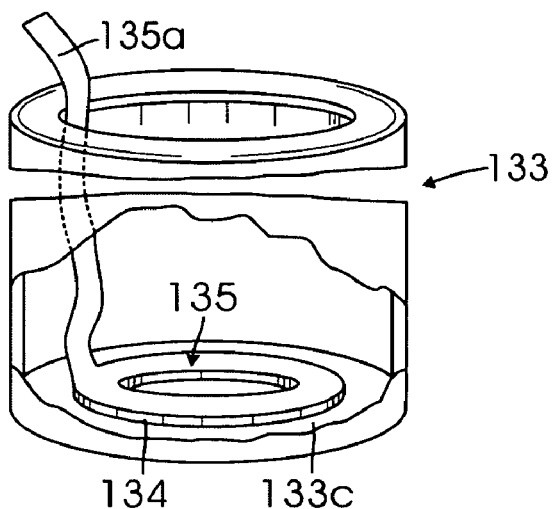
FIG. 11 is a partially broken away perspective view of a portion of the sheath of the embodiment of the device illustrated in FIG. 10, as viewed from the side of and above the sheath and illustrating the adhesive layer and peel-off strip that further comprise the object sealing means.

As illustrated in FIG. 2, the tapered surface 25a of the flange member 25 may enhance the seal between the pipe 15, the sheath 33, and the flange member 25 by providing a greater sealing surface area when the pipe 15 has a tapered, as opposed to a flat, distal end 17. In other embodiments, the tapered surface 25a may have a different degree of taper, such as an angle in the preferred range from 45 degrees to 60 degrees, rather than the approximately 45 degrees illustrated in FIG. 2. In still other embodiments, the tapered surface 25a of the flange member 25 may be parallel to the longitudinal axis of the internal member 30 or the casing member 20 or both. This type of structure is illustrated by the device 110 illustrated in FIG. 10. In this embodiment, the surfaces of the flange member 125 and the base support members 123c each have a surface across the thickness of their interior perimeters that are parallel to one another and to the longitudinal axis of the casing member 120 and the internal member 130. In addition, as is also illustrated in FIG. 11, the base sealing portion 133c of the sheath 133 in this embodiment has an adhesive layer 134 and a peel-off strip 135 (which is not illustrated in FIG. 10) positioned on the surface of the base sealing portion 133c approximately adjacent to the internal item opening 131d. The adhesive layer 134 is comprised of any suitable adhesive and the peel-off strip 135 is positioned over the adhesive layer 134 to protect it and keep it from setting or drying out during storage prior to use of the device 110. Preferably, the adhesive layer 134 is comprised of an adhesive material that is resistant to the fluid contained in the object (pipe 115) and the peel-off strip 135 is comprised of paper or a polymer material. For example, the adhesive layer 134 and peel-off strip 135 may be comprised of double coated urethane, vinyl or polyethylene adhesive tapes with release liners, such as those manufactured by the 3M Company (e.g., Double Coated Polyethylene Foam Tape 4496). A portion 135a of the peel-off strip 135 extends from the adhesive layer 134 through the object opening 122a to an area outside the interior space 124 of the device 110. In operation, and prior to inserting the pipe 115 into the device 110, the user of the device 110 pulls on the portion 135a of the peel-off strip 135 that extends through the object opening 122a until the peel-off strip 135 is removed from the device 110, exposing the adhesive layer 134. The pipe 115 is then inserted into the device 110 and rotated into the ridges 132g, as described above and illustrated in connection with FIG. 10. In this embodiment, however, the pipe 115 is rotated into the adhesive layer 134 as the sheath 133 is being compressed against the flange member 125. The adhesive in the adhesive layer 134 adheres to the surfaces at the distal end 17 of the pipe 115, as well as the adjoining surface of the sheath 133. When the adhesive in the adhesive layer 134 is allowed to set, the adhesive provides an even greater strength of object sealing means that may be more appropriate for use at higher operating pressures of the device 110. It is to be noted that in other embodiments of the present invention, an adhesive layer 134 may be utilized with the sheath 133 without a peel-off strip 135. This may be the case where the type of adhesive used in the adhesive strip 134 will not dry out during storage. Other examples include adhesive tapes, such as 3M Company's urethane, vinyl or polyethylene double sided adhesive tapes. In such cases, the device 110 may be enclosed within air-evacuated, fluid-tight packaging to prevent the adhesive from drying out. In yet other embodiments, the device 110 may also comprise a container of adhesive (not illustrated), which the user of the device 110 may open and use to apply adhesive from the container to the distal end 117 of the pipe 115 or to the sheath 133 or both. Further still, all or a portion of the sheath 133 may be sealed to all or a portion of the flange member 125 using a suitable adhesive, epoxy or adhesive tape. It is to be noted that the use of an adhesive layer 134 or other adhesive-related means may not necessarily mean that the connection is permanent. For example, the semi-flexible nature of the sheath 133 may allow the base sealing portion 133c to be torn away when the pipe 115 is removed. In these instances, the device 110 will not be suitable for re-use until the sheath 133 (or its damaged portion) has been replaced or repaired.

Figure 12A:
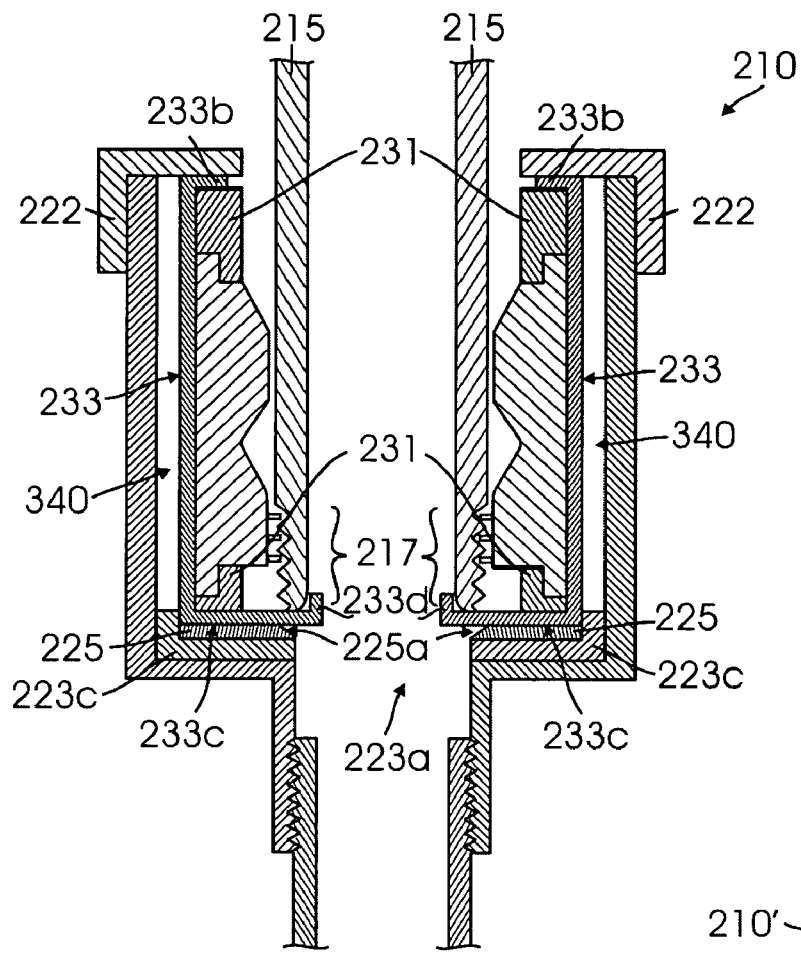
FIG. 12A is a sectional elevation view of the embodiment of the device illustrated in FIG. 1 and FIG. 2, except that the illustrated embodiment has a different object sealing means and case cap connecting means.
Figure 17:
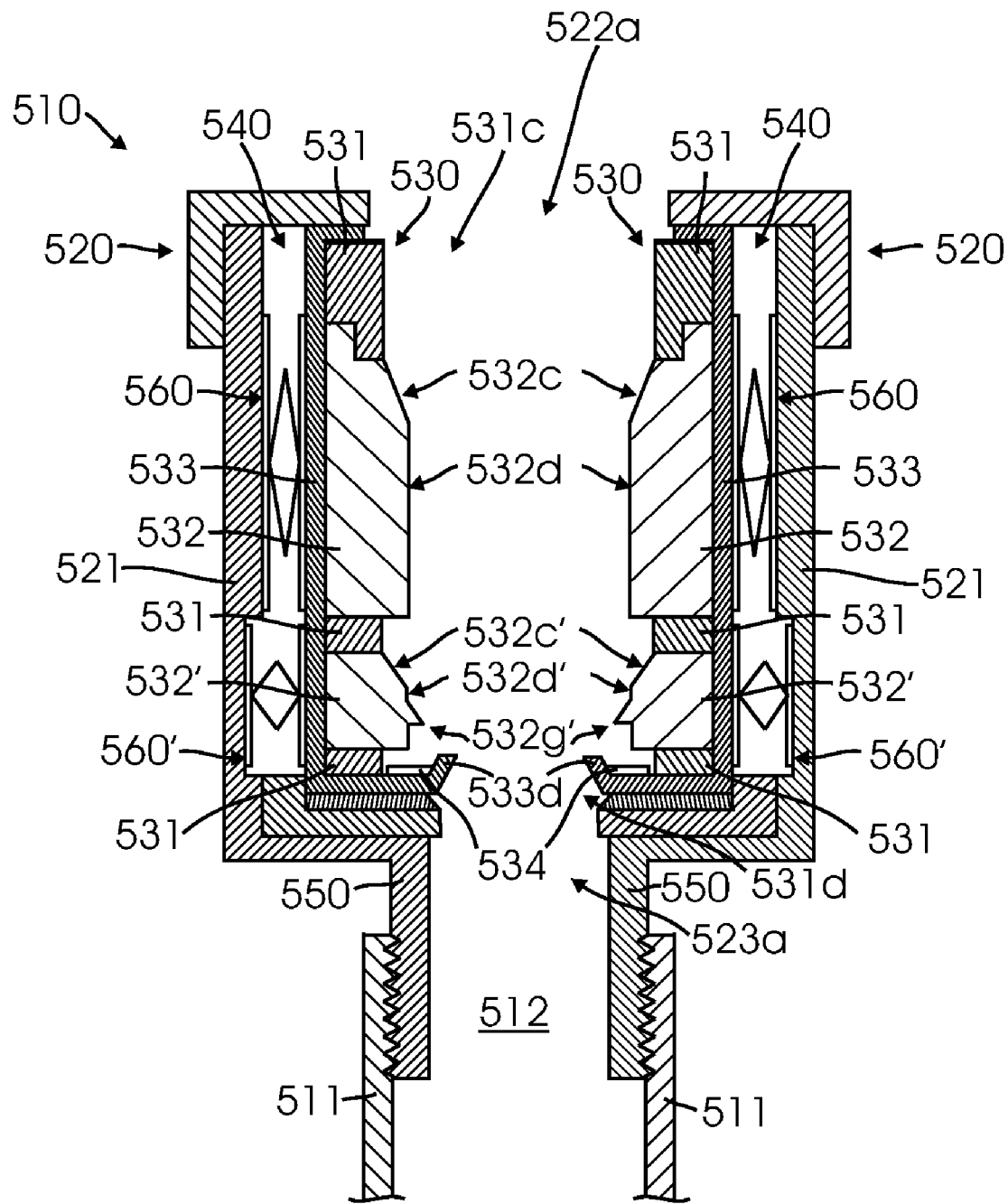
FIG. 17 is a sectional elevation view of another embodiment of a device of the present invention.

Yet another embodiment of the object sealing means is depicted in the device 210 illustrated in FIG. 12A. In this embodiment, the base sealing portion 233c of the sheath 233 has a raised lip portion 233d that extends around the interior perimeter of the base sealing portion 233c. When the pipe 215 is rotated, drawing the pipe 215 in the direction of the item opening 223a, the distal end 217 of the pipe 215 displaces the base sealing portion 233c downward. For pipes 215 having a relatively small acceptable outside diameter, the distal end 217 of the pipe 215 forces the base sealing portion 233c against the tapered surface 225a of the flange member 225 and draws the raised lip 233d against the distal end and adjoining portions of the end 217 of the pipe 215, increasing the surface area of the seal. For pipes 215 having a relatively large acceptable outside diameter, the distal end 217 of the pipe 215 compresses the base sealing portion 233c against the flat surface portion of the flange member 225, forming the fluid-tight seal. As illustrated in FIG. 17, the raised lip portion 533d may have other shapes that allow it to more effectively engage the end of the pipe (not illustrated). As is also illustrated in FIG. 17, an adhesive layer 534, adhesive tapes, adhesives, epoxies or other similar means or combinations of such means may be utilized to assist in making the fluid-tight seal in embodiment utilizing raised lip portions 233d, 533d.

It is to be noted that multiple means and combinations of means may be used to comprise the object sealing means. For example, each of the features of the object sealing means described above and illustrated in connection with FIG. 1, FIG. 10, and FIG. 12A may generally be used with one another in different combinations where appropriate. In addition, and continuing to refer to the device 210 of FIG. 12A as an example, the sheath 233 may have different shapes, protruding portions (such as ridges, beads or other raised portions or combinations thereof), recessed portions (such as channels, grooves, or other recessed portions or combinations thereof), or other features that may be used to create or enhance the fluid tight-seal comprising the object sealing means (and therefore the internal member sealing means). Similarly, the core member 231, the flange member 225, and the base support members 223c may also have different shapes or comprise portions, such as beads, ridges, grooves, channels, and other protruding and recessed features that may be used to create or enhance the fluid tight-seal comprising the object sealing means or the internal member sealing means or both.

Figure 12B:
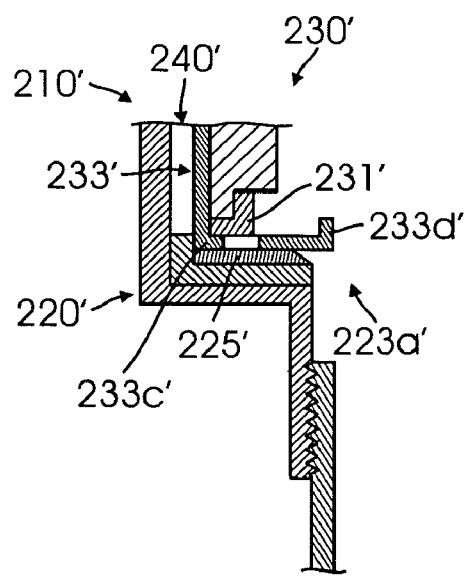
FIG. 12B is a partial sectional elevation view of the embodiment of the device illustrated in FIG. 12A, except that the base sealing portion of the sheath has a diameter greater than the inside diameter of the core member and the object sealing means is comprised of a separate sealing member that has a raised lip.

As illustrated in FIG. 12B, the object sealing means may also be comprised of a structure other than a portion of the sheath 233'. In this embodiment, the illustrated device 210' is a portion of the device 210 of FIG. 12A, except that the base sealing portion 233c' of the sheath 233' of the device 210' has an inside diameter greater than the inside diameter of the core member 231' and the device 210' also comprises a separate object sealing member 233d'. The base sealing portion 233c' of the sheath 233', which has a diameter relative to the core member 230' similar to the diameter of the cap sealing portion 233b relative to the core member 231 of FIG. 12A, permits the core member 231' to be sealed to the flange member 225' in substantially the same manner that the upper sealing member 233b is used to seal the core member 231 to the case cap 222, as described above and illustrated in connection with FIG. 12A. In the embodiment illustrated in FIG. 12B, the object sealing member 233d' may have substantially the same structure, features, characteristics and operation as the portion of the base sealing portion 233c of the sheath 233 that acts as the object sealing means to seal the object (pipe 215) to the internal member 230, as described above and illustrated in connection with FIG. 12A. In other embodiments, the separate object sealing member 233d' may have substantially the same structure, features, characteristics and operation as any of the object sealing means described above and illustrated in connection with FIG. 1, FIG. 10, and FIG. 12A, with the separate object sealing member 233d' serving substantially the same function as the base sealing portions 33c, 133c, 233c that act as the object sealing means in such embodiments. For example, in other embodiments, the object sealing member 233' may have substantially any of the structures, features, characteristics and operation as the portion of the base sealing portion 233c of the sheath 233, the core member 231, and the casing member 220 that comprises the object sealing means, as described above and illustrated in connection with FIG. 12A. As another example, the object sealing member 233d' may be comprised of a gasket, washer, o-ring, adhesive layer, adhesive, adhesive tape, epoxy, or other member or any combination of the same. As yet another example, the separate object sealing member 233d' may be comprised of a rubber gasket with an adhesive layer having a peel-off strip (not illustrated), wherein the rubber gasket is attached to the flange member 225' adjacent to the item opening 223a' by an adhesive or adhesive tape. As still another example, the separate object sealing member 233d' may be comprised of an adhesive layer (which may also have a peel-off strip (not illustrated)), wherein the adhesive layer is attached to the flange member 225' adjacent to the item opening 223a' by the adhesive in the adhesive layer. In various embodiments, the separate object sealing member 233d' may be, but is not necessarily, attached to the flange member 225', the core member 231', or any other appropriate portion of the casing member 220' by an adhesive, adhesive tape, epoxy, clamp, clip, clasp, nails, screws, nuts, bolts, or other fastener or combinations of such fasteners.

Figure 14:
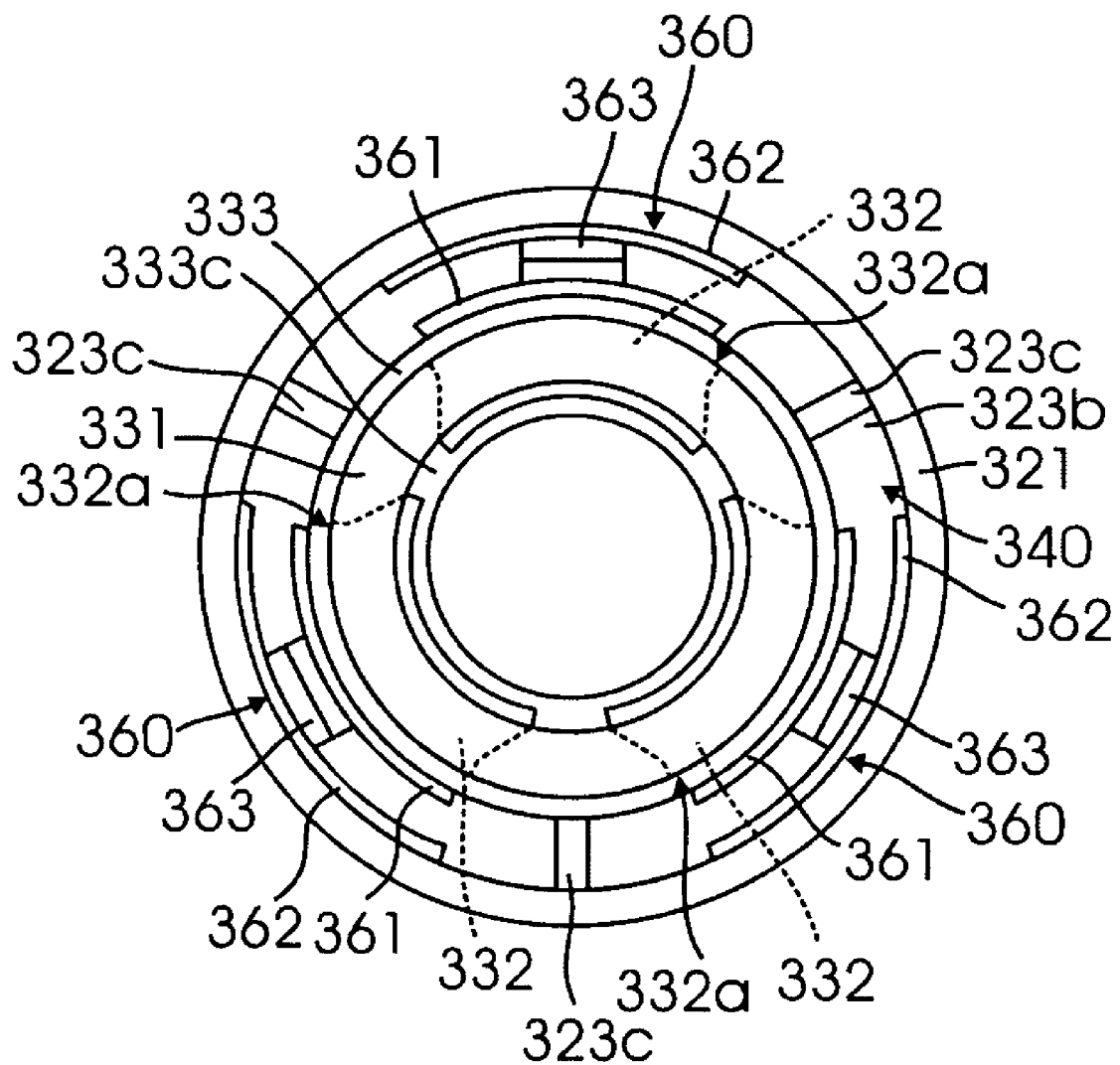
FIG. 14 is a sectional plan view of the embodiment of the device illustrated in FIG. 13, as taken along the lines 14-14 in FIG. 13.

Another embodiment of the present invention is the device 310 illustrated in FIG. 13 and FIG. 14. In this embodiment, the device 310 is comprised of a casing member 320, an internal member 330, core member sealing means (which are described in more detail below) to seal the internal member 330 to the casing member 320, object/device sealing means (which are described in more detail below) to seal the object (pipe 315) to the device 310, mechanical compression means (which are described in more detail below), and item connecting means (MIP adapter 350) to connect the item (pipe 311) to the casing member 320. Generally, the internal member 330 may have substantially the same structure, features, characteristics and operation as the various embodiments of the internal members 30, 130, 230, 230' described above and illustrated in connection with FIG. 1 through FIG. 12B. In addition, the casing member 320 may have substantially the same structure, features, characteristics and operation as the various embodiments of the casing members 20, 120, 220, 220' described above and illustrated in connection with FIG. 1 through FIG. 12B, except that the case base 323 of the casing member 320 of this embodiment has a different structure. For example, in the illustrated embodiment, the case base 323 does not have a flange member (such as flange member 25 illustrated in FIG. 2 and FIG. 3B) and has base support members 323c that are positioned around the outside circumference of the internal member 330, but not between the internal member 330 and the base plate member 323b. Thus, the base sealing portion 333c of the sheath 333 is positioned adjacent to the interior surface of the base plate member 323b. When the internal member 330 is positioned in the interior space 324 of the casing member 320 and the case cap 322 is positioned on the case body 321 using the case cap connecting means, the cap sealing portion 333b of the sheath 333 is compressed between the core member 331 and the case cap 322 and the base sealing portion 333c of the sheath 333 is compressed between the core member 331 and the base plate member 323b resulting in a fluid-tight seal between the casing member 320 and internal member 330 at such locations.

The device 310 is also comprised of mechanical compression means. In the embodiment illustrated in FIG. 13 and FIG. 14, the mechanical compression means are comprised of three spring mechanisms 360. Each spring mechanism 360 is comprised of an interior support plate 361, an exterior support plate 362, and two spring members 363 positioned between the interior support plate 361 and the exterior support plate 362. The spring mechanisms 360 are each adapted to be of a size and shape so that they fit within the chamber 340 generally formed between the internal member 330 and the casing member 320. In addition, the inside diameter of the case body 321, the outside diameter of the internal member 330, and the spring mechanisms 360 are also adapted to be of a size and shape so that the spring mechanisms 360 can be deflected an appropriate amount when an object (pipe 15) of acceptable size is inserted into (and received by) the device 310, as described in more detail below. Thus, the interior support plate 361 is generally configured to conform to the exterior surface of the side wall of the internal member 330. The exterior support plate 362 is generally configured to conform to the interior surface of the side wall of the case body 321. In other embodiments, the interior support plate 361 and the exterior support plate 362 may take other forms, shapes and sizes, depending upon the size and shape of the internal member 330 and the casing member 320 and the acceptable size and shape of the object (pipe 315). In some embodiments where the structure of the two spring members 363 do not require such support, the spring mechanisms 360 (or a portion of them) may not have an interior support plate 361 or an exterior support plate 362 or either of them. Alternatively, where the geometry of the device 310 requires it (or it is otherwise desirable), all or some of the spring mechanisms 360 may have more than two support plates. The interior support plate 361 and the exterior support plate 362 may each be comprised of any suitable material, such as the materials that may be used to comprise the case body 321 or the core member 331, or any combination of such materials. Preferably, the interior support plate 361 and the exterior support plate 362 are constructed of a plastic material (such as polyvinyl chloride). The two spring members 363 may each be comprised of any suitable spring-type mechanism and material having elastic properties, so that the two spring members 363 deform when a force is applied against them, but they return to approximately their original shape when the force is removed. For example, the two spring members 363 may be comprised of leaf-type springs, coiled springs, or other spring-type mechanisms or combinations of such mechanisms. Examples of suitable elastic materials include metal, wood, elastic polymers, or other elastic materials or combinations of such materials. Preferably, the degree of resistance to movement (deflection) of the two spring members 363 increases in proportion to the degree of deflection, so that an increasingly greater force is required to further deflect the two spring members 363 as the amount of deflection increases. More preferred, the two spring members 363 are a leaf-type spring, as illustrated in FIG. 13 and FIG. 14, constructed of spring steel. It is to be noted that although two spring members 363 are included in the spring mechanisms 360 of this embodiment, which is the preferred number, there may be only one spring member 363 or more than two spring members 363 in other embodiments of the spring mechanisms 360. Preferably, the number of spring mechanisms 360 corresponds to the number of tab members 332, and the spring mechanisms 360 are positioned over the exterior surface 332a of the tab members 332, as illustrated in FIG. 13 and FIG. 14. In other embodiments, there may be only one spring mechanism 360 (this may the case where there is a stationary support (not illustrated) on one side of the internal member 330 and a single spring mechanism 360 on the other side) or more than three spring mechanisms 360. In addition, in other embodiments, the spring mechanisms 360 may be placed in any position where they are able to perform their function of holding the tab members 332 in place against the surface of the pipe 315 by friction, as described in more detail below.

Figure 15A:
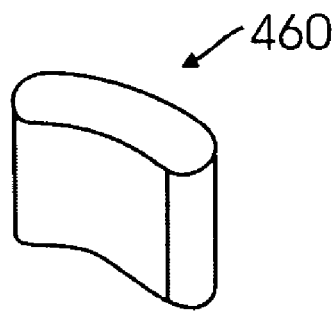
FIG. 15A is a perspective view of an alternative embodiment of the mechanical compression means, as viewed from the side of and above such means.
Figure 15B:
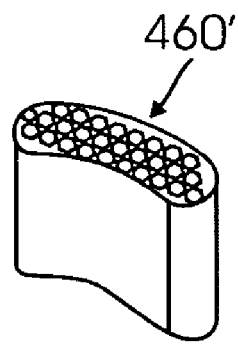
FIG. 15B is a perspective view of another alternative embodiment of the mechanical compression means, as viewed from the side of and above such means.
Figure 16:
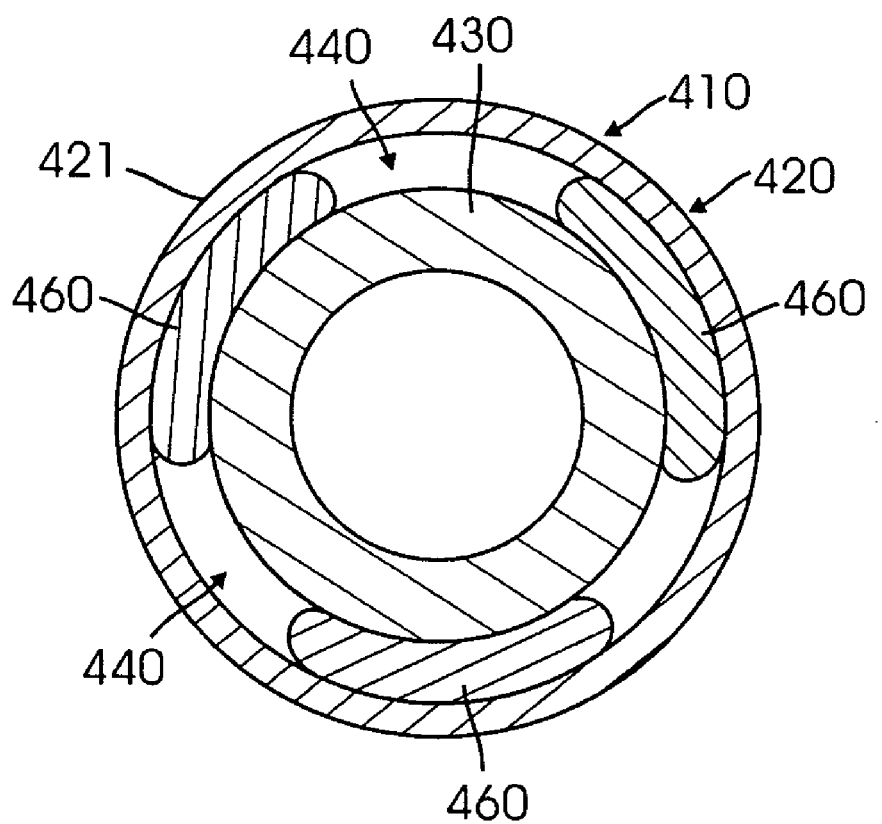
FIG. 16 is a sectional plan view of the embodiment of the device illustrated in FIG. 13, as taken along the lines 14-14 in FIG. 13, except that the device incorporates the embodiment of the mechanical compression means illustrated in FIG. 15A and does not separately illustrate the sheath.

In still other embodiments, the mechanical compression means may be comprised of means other than a spring-type mechanism, such as spring mechanisms 360. For example, as illustrated in FIG. 15A and FIG. 16, the mechanical compression means may be comprised of compressible inserts 460. In this embodiment, the casing member 420 and the internal member 430 may have substantially the same structure, features, characteristics and operation as the casing member 320 and internal member 320 described herein and illustrated in connection with FIG. 13 and FIG. 14. In some embodiments, the compressible inserts 460 may be comprised of hollow, inflatable bladders that contain a compressible fluid, such as air or nitrogen. In this case, the bladders are constructed in whole or in part of rubber, another flexible polymer, cloth, fabric, or other flexible materials or combinations of such materials. Alternatively, the compressible inserts 460 may be comprised in whole or in part of a resilient foam-type of material that compresses when pressure is exerted on its surface. For example, the compressible inserts 460 may be comprised of polyurethane foam or another open cell-type foam material or combinations of such materials. Such material may also be positioned within a bladder, as described above. In yet other embodiments, as illustrated in FIG. 15B, the compressible inserts 460' may be comprised of semi-flexible materials that have a structure allowing them to be compressed, while exerting a counter force against compression. For example, the compressible inserts 460' may be comprised of a semi-flexible polymer, such as silicone, having a "honeycomb" pattern, as illustrated in FIG. 15B. It is to be noted that many different combinations of materials and structures may be utilized in the compressible inserts 460', 460". In any case, and referring to FIG. 16 as an example, the compressible inserts 460 may be positioned within the chamber 440 in substantially the same manner as the spring mechanisms 360 are positioned within the chamber 340, as described above and illustrated in connection with FIG. 13 and FIG. 14. In some embodiments, each of the compressible inserts 460 is preferably smaller than the outside surface of its corresponding tab member (not illustrated). In embodiments where the chamber 440 is in fluid communication with the interior space of the object and item (not illustrated), this allows radially inward force to be exerted on the sheath (not illustrated), and consequently on the tab members, as pressure increases in the chamber 440. As the object (not illustrated) is inserted into the device 410, the tab members move (or slide) radially outward and exert pressure against the sheath (not illustrated), which exerts a radially outward force on the compressible inserts 460 in a manner that is substantially similar to the operation of the spring mechanisms 360 described above and illustrated in connection with FIG. 13 and FIG. 14. As the compressible inserts 460 are compressed, they create a counter force, tending to exert pressure radially inward against the sheath, and consequently, the tab members, which are forced against the outside surface of the object in a manner substantially similar to that described above and illustrated in connection with FIG. 13 and FIG. 14. It is to be noted that in various embodiments, the compressible inserts 460, 460' may have almost any shape or combination of shapes, as long as the shape of the compressible inserts 460, 460' allows the tab members to be radially displaced the appropriate distance, and the compressible inserts 460, 460' are able to perform their intended function of exerting radial inward pressure against the sheath and tab members.

In the embodiment of the device 310 illustrated in FIG. 13 and FIG. 14, the internal member 330 may generally be constructed in substantially the same manner as any of the internal members 30, 130, 230, 230', as described above and illustrated in connection with FIG. 1 through FIG. 12B. Similarly, the casing member 320 may generally be constructed in substantially the same manner as any of the casing members 20, 120, 220, 220', as described above and illustrated in connection with FIG. 1 through FIG. 12B. In addition, the item (pipe 311) may be connected to the casing member 320 using the item connecting means (MIP adapter 350). It is to be noted that any of the item connecting means described above and illustrated in connection with FIG. 1 through FIG. 12B may also be utilized. The internal member 330 is positioned within the interior space 324 of the casing member 320 by positioning the base sealing portion 233c of the sheath 233 against the base plate member 323b of the casing member 320. The internal member 330 is held in place radially by the base support members 323c. The spring mechanisms 360 are then positioned in the chamber 340 generally formed between the internal member 330 and the casing member 320. Each spring mechanism 360 may be installed in the chamber 340 by compressing its spring members 363, placing the spring mechanism 360 in the appropriate position in the chamber 340, and then releasing the compressive force on the spring member 363. Although other means, such as adhesives, adhesive tapes, screws, clamps, clasps or other fastening means or combinations of such means may be used to attach the spring mechanisms 360 to the internal member 330 or the casing member 320 or both, the preferred means of attachment is the force exerted by the spring mechanisms 360 alone. Alternatively, the spring members 360 may be fabricated as a part of the internal member 330 or the casing member 320. Preferably, each of the spring mechanisms 360 is positioned approximately over the center of the exterior surface 332a of a tab member 332. Thus, the tab members 332 are held in place relative to the core member 331 by the sheath 333 and the spring mechanisms 360.

When the internal member 330 is positioned in the interior space 324 of the casing member 320, the spring mechanisms 360 are in position in the chamber 340, and the case cap 322 is positioned on the case body 321 using the case cap connecting means, the internal member 330 is sealed to the casing member 320 by the core member sealing means. In the illustrated embodiment, the core member sealing means is comprised of the cap sealing portion 333b of the sheath 333 being compressed between the core member 331 and the case cap 322 and the base sealing portion 333c of the sheath 333 being compressed between the core member 331 and the case base 323, resulting in a fluid-tight seal between the casing member 320 and internal member 330 at such locations. In other embodiments, the core member sealing means may be comprised in whole or in part of, or in any combination of, any of the internal member sealing means described above and illustrated in connection with FIG. 1 through FIG. 12B, except that the core member sealing means acts to create a fluid tight seal between the internal member 330 and the base plate member 323b of the casing member 320, rather than with a flange member, as is the case, for example, with the flange member 25 described above and illustrated in connection with FIG. 2 and FIG. 3B. In yet other embodiments, the device 310 need not include any core member sealing means at all. For example, contrary to the embodiments of the devices 10, 110, 210, 210' described above and illustrated in connection with FIG. 1 through FIG. 12B, the chamber 340 of the illustrated embodiment is not necessarily fluid-tight. Although fluid-tight seals are created between the core member 331, the base sealing portion 333c of the sheath 333, and the base plate member 323b in the illustrated embodiment, the device 310 may operate with only the object/device sealing means represented by the seal between the distal end 317 of the pipe 315, the base sealing portion 333c of the sheath 333, and the base plate member 323b, as described in more detail below. As a result of this seal, the chamber 340 is not in fluid communication with the interior space 316 of the object (pipe 315) or the interior space 312 of the item (pipe 311), but the object (pipe 315) is indirectly sealed to the item (pipe 311) by means of the device 310. The seal between the case cap 322 and the core member 321 in this embodiment serves primarily to hold the sheath 333 in position when the pipe 315 is inserted into the device 310, as described in more detail below. It is to be noted that the sheath 333 need not be utilized at all in embodiments of the device 310 incorporating mechanical compression means. In such cases, the mechanical compression means are used to exert pressure against the tab members 332 in order to force them against the object (pipe 315) so that the object (pipe 315) is held in place relative to the tab members 332 by friction.

It is to be noted, however, that any of the embodiments of the devices 10, 110, 210, 210', with respect to formation of chambers 40, 140, 240, 240', respectively, described above and illustrated in connection with FIG. 1 through FIG. 12B, may also be used in embodiments of the present invention in conjunction with mechanical compression means (spring mechanisms 360). In such embodiments, the pipe 315 (including the pipe end 317), the core member 331, the sheath 333, and the tab members 332 may have substantially the same structure, features, characteristics and operation as, for example, the pipe 15 (including the pipe end 17), the core member 30, the sheath 33, and the tab members 32 described above and illustrated in connection with FIG. 1 through FIG. 7. Also in such embodiments, as illustrated in FIG. 1 and FIG. 2, the mechanical compression means (spring mechanisms 360) are positioned within the chamber 40, which is and in fluid communication with the interior space 12, 16 of the pipes 11, 15, respectively. As pressure increases within the chamber 40, the increased pressure acts in conjunction with the mechanical compression means (spring mechanisms 360) to exert force on the tab members 32 radially inward so that the tab members 32 hold the pipe 15 in place relative to the device 10 by friction. Thus, the device 310 may, in some embodiments, operate in substantially the same manner as the device 10, with the enhancement of the spring mechanisms 360.

Referring to FIG. 13 and FIG. 14, the device 310 operates in the following manner. First, the end 317 of the object (pipe 315) is inserted into (and received by) the object opening 322a of the casing member 320 and the internal object opening 331c of the internal member 330. In this embodiment, the object (pipe 315) has a generally cylindrical shape and an outside diameter within a predetermined range. For example, the pipe 315 in some embodiments may have an outside diameter within the range of 1.05 inches to 1.32 inches. In addition, the pipe 315 may have a variety of different thread types on its end 317, as is the case with the end 17 of the pipe 15 described in more detail above and illustrated in connection with FIG. 1 and FIG. 2. Thus, the device 310 is capable of connecting to a variety of different types and sizes of pipes 315. As the pipe 315 is inserted into (and received by) the device 310, the distal end 317 of the pipe 315 abuts the tapered surfaces 332c of the tab members 332. As the pipe 315 continues to be pressed into the device 310, the tab members 332 are displaced radially outward as the pipe 315 continues to travel along the longitudinal axis of the internal member 330 toward the item opening 323a of the device 310. As the tab members 132 are displaced radially outward, they are pressed against the sheath 133, which stretches and is also displaced radially outward from the core member 331 due to the semi-flexible nature of the sheath 333. In addition, as the tab members 332 are displaced radially outward, the spring mechanisms 360 provide an increasing amount of force on the tab members 332 in a radially inward direction. It is to be noted that the inside and outside diameters of the core member 331, the inside diameter of the casing member 320, the size, shape and strength of the force of the spring mechanisms 360, the contacting surface 332d texture, the size and shape of the tab members 332, additional gripping means (if any), and the thickness and flexibility of the sheath 333, are adapted so that when an object (pipe 315) of maximum allowable outside diameter is inserted into (and received by) the device 310, the tab members 332 may be displaced the required distance radially outward, while the tab members 332 continue to be held in place in the core member 331 by the sheath 333 and the spring mechanisms 360. In addition, these parameters are adapted so that the pipe 315 is adequately held in place relative to the tab members 332 by friction when pipes 315 having both minimum and maximum acceptable outside diameters are used with the device 310. When the distal end 317 of the pipe 315 reaches the contacting surfaces 332d of the tab members 332, the pipe 315 continues to slide along the contacting surfaces 332d until the distal end 317 of the pipe 315 makes contact with and is sealed to the internal member 330 or the casing member 320 by the object/device sealing means, which are described in more detail below. Preferably, the contact surfaces 332d of the tab members 332 are further comprised of a gritted surface as gripping means. After the object/device sealing means (described in more detail below) have been used to seal the object (pipe 315) to the internal member 330 and the casing member 320, and the item (pipe 311) has been connected to the casing member 320 using the item connecting means (MIP connector 350), fluids may be transmitted from the interior space 316 of the pipe 315 to the interior space 312 of the pipe 311, or vice versa, in a manner that provides a fluid-tight seal between the pipes 315, 311.

The object/device sealing means of the embodiment of the device 310 illustrated in FIG. 13 and FIG. 14 may have substantially the same structure, features, characteristics and operation as any of the object sealing means and object sealing members described above and illustrated in connection with FIG. 1 through FIG. 12B, except that the object/device sealing means of the device 310 utilize the base plate member 323b to assist in sealing the pipe 315 to the device 310, rather than a flange member, such as the flange member 25 described above and illustrated in connection with FIG. 1 through FIG. 7. In the illustrated embodiment, the object/device sealing means is comprised of the end 317 of the pipe 315 compressing the base sealing portion 333c of the sheath 333 against the interior surface of the base plate member 323b. It is to be noted that in other embodiments of the device 310 illustrated in FIG. 13 and FIG. 14, the object/device sealing means may comprise the pipe 315 being sealed directly to the base plate member 323b without using a sheath 333 or any similar type of component.

Another embodiment of the present invention is illustrated in FIG. 17, which is the most preferred embodiment of the present invention. In this embodiment, and except as otherwise provided below, the internal member 530 of the device 510 may generally have substantially the same structure, features, characteristics and operation as any of the internal members 30, 130, 230, 230' described above and illustrated in connection with FIG. 1 through FIG. 12B. Preferably, the core member 531 is comprised of a plastic material, such as polyvinyl chloride, and the sheath 533 is comprised of a single piece sheath 531 constructed of rubber, as illustrated in FIG. 2 and FIG. 3A. Similarly, except as otherwise provided below, the casing member 520 may generally have substantially the same structure, features, characteristics and operation as any of the casing members 20, 120, 220, 220' described above and illustrated in connection with FIG. 1 through FIG. 12B. Preferably, the casing member 520 is also comprised of a plastic material, such as polyvinyl chloride, and generally has substantially the same structure as the casing member 20 illustrated in FIG. 1, FIG. 2, and FIG. 3B. In addition, the item (pipe 511) may be connected to the casing member 520 using the item connecting means (MIP adapter 550), which is the preferred item connecting means where the object (not illustrated) is to be connected to another pipe 511. It is to be noted, however, that any of the item connecting means described above and illustrated in connection with FIG. 1 through FIG. 12B may also be utilized. Further, any of the internal member sealing means or any of the object sealing means or both, as described above and illustrated in connection with FIG. 1 through FIG. 12B, or any of the core member sealing means or object/device sealing means or both described above and illustrated in connection with FIG. 13 and FIG. 14, may be utilized in conjunction with the device 510. Preferably, the object sealing means is comprised of the sheath 533 (including the raised lip portion 533d), an adhesive layer 534 having a peel-off strip (not illustrated) positioned on the sheath 533, and the casing member 520, each having the structure illustrated in FIG. 17. Further still, mechanical compression means (three primary spring mechanisms 560 and three secondary spring mechanisms 560') are positioned within the chamber 540. Although these are the preferred mechanical compression means, any of the mechanical compression means described above and illustrated in connection with FIG. 13 through FIG. 16 may also be utilized. In other embodiments, the device 510 need not include any primary mechanical compression means (primary spring mechanisms 560) or any secondary mechanical compression means (secondary spring mechanisms 560'). Similarly, the device 510 may not utilize any mechanical compression means. In the illustrated embodiment, the chamber 540 is in fluid communication with the interior space 512 of the item (pipe 511) and the interior space of the object (not illustrated) in substantially the same manner as any of the chambers 40, 140, 240, 240' described above and illustrated in connection with FIG. 1 through FIG. 12B. Although this is the preferred embodiment, in other embodiments the chamber 540 may not be in fluid communication with the interior space 512 of the item (pipe 511) or the interior space of the object, as is the case with the chamber 340 described above and illustrated in connection with FIG. 13 and FIG. 14.

In the illustrated embodiment, the interior member 530 is comprised of three primary tab members 532 and three secondary tab members 532', which are each positioned within the core member 531 in substantially the same manner as the tab members 32 are positioned in the core member 31, as described above and illustrated in connection with FIG. 1 through FIG. 7, except that the secondary tab members 532' are positioned approximately adjacent to the internal item opening 531d (as oriented in FIG. 17) and the primary tab members 532 are positioned between the secondary tab members 532' and the internal object opening 531c of the core member 531. Although each of the primary tab members 532 is preferably positioned directly above (as oriented in FIG. 17) one of the secondary tab members 532', when viewed from above the internal object opening 531c, the primary tab members 532 may be off-set from the secondary tab members 532' when viewed from this perspective. Although each of the primary tab members 532 may have substantially the same structure, features, characteristics and operation as any of the tab members 32, 132, 332 described above and illustrated in connection with FIG. 1 through FIG. 14, preferably the primary tab members 532 are comprised of a plastic material, such as polyvinyl chloride, and utilize a gritted surface as gripping means, as described above and illustrated in connection with FIG. 13 and FIG. 14, without any ridges, such as the ridges 32g described above and illustrated in connection with FIG. 1 through FIG. 7. Each of the secondary tab members 532' may also have substantially the same structure, features, characteristics and operation as any of the tab members 32, 132, 332 described above and illustrated in connection with FIG. 1 through FIG. 14, but preferably the secondary tab members 532' are comprised of a plastic material, such as polyvinyl chloride, and utilize at least one ridge 532g' as gripping means. In this embodiment, one ridge 532g' having the shape illustrated in FIG. 17 is preferred, and the ridge 532g' preferably extends around the portion of the circumference of the interior surface of each secondary tab member 532' in substantially the same manner as the ridges 32g on the tab members 32, as described above and illustrated in connection with FIG. 1 through FIG. 7. It is to be noted that in the illustrated embodiment, the wall thickness of the case body 521 is preferably reduced in the area of the secondary spring mechanisms 560', so that the chamber 540 has a greater width, allowing the secondary tab members 532' to be displaced a greater distance radially outward than the primary tab members 532. In addition, the secondary tab members 532' each have an upper tapered surface 532c' that is similar to the upper tapered surface 532c of the primary tab members 532.

Referring to FIG. 17, the device 510 operates in the following manner. First, the end of an object (not illustrated) is inserted into (and received by) the object opening 522a of the casing member 520 and the internal object opening 531c of the internal member 530. The object may be substantially the same as any of the objects (including pipes 15, 115, 215, 315, having a distal end with or without threads) described above and illustrated in connection with FIG. 1 through FIG. 16. In this embodiment, the object has a generally cylindrical shape and an outside diameter within a predetermined range. As the object is inserted into (and received by) the device 310, the distal end of the object abuts the tapered surfaces 532c of the primary tab members 532, displacing the primary tab members 532 radially outward against the sheath 533 and the spring mechanisms 560 in substantially the same manner as the tab members 332 are displaced radially outward against the sheath 333 and the primary spring mechanisms 360, as described above and illustrated in connection with FIG. 13 and FIG. 14. It is to be noted that the inside and outside diameter of the core member 531, the inside diameter of the casing member 520, the size, shape and strength of the force of the primary spring mechanisms 560, the contacting surface 532d texture, the size and shape of the primary tab members 532, additional gripping means (if any), and the thickness and flexibility of the sheath 533, are adapted so that when an object of maximum allowable outside diameter is inserted into (and received by) the device 510, the primary tab members 532 may be displaced the required distance radially outward, while the primary tab members 532 continue to be held in place in the core member 531 by the sheath 533 and the primary spring mechanisms 560. In addition, these parameters are adapted so that the object is adequately held in place relative to the primary tab members 532 by friction when objects having both minimum and maximum acceptable outside diameters are used with the device 510. When the distal end of the object reaches the contact surfaces 532d of the primary tab members 532, the object continues to slide along the contacting surfaces 532d until the distal end of the object makes contact with the tapered surfaces 532c' of the secondary tab members 532'. As the object is pressed further into the device 510, the secondary tab members 532' are displaced (slide) radially outward against the sheath 533 and the secondary spring mechanisms 560' in substantially the same manner as the tab members 332 are displaced radially outward against the sheath 333 and the spring mechanisms 360, as described above and illustrated in connection with FIG. 13 and FIG. 14. It is to be noted that the inside and outside diameters of the core member 531, the inside diameter of the casing member 520, the size, shape and strength of the force of the secondary spring mechanisms 560', the contacting surface 532d' texture, the size and shape of the secondary tab members 532', the ridge 532g', and the thickness and flexibility of the sheath 533, are adapted so that when an object of maximum allowable outside diameter is inserted into (and received by) the device 510, the secondary tab members 532' may be displaced the required distance radially outward, while the secondary tab members 532' continue to be held in place in the core member 531 by the sheath 533 and the secondary spring mechanisms 560'. In addition, these parameters are adapted so that the object is adequately held in place relative to the secondary tab members 532' by friction when objects having both minimum and maximum acceptable outside diameters are used with the device 510. When the distal end of the object reaches the contact surfaces 532d of the primary tab members 532, the object continues to slide along the contacting surfaces 532d until the distal end of the object abuts the ridges 532g' of the secondary tab members 532'. The object may then be rotated so that the threads on the distal end of the object engage the ridges 532g on the secondary tab members 532. As the object is rotated (in a clockwise manner for standard NPT pipe threads), the object is drawn toward the item opening 523a of the device 510 by the ridges 532g' acting in the same manner as would be the case with corresponding threads on a receiving fitting. The object is rotated in this manner until the distal end of the object makes contact with and is sealed to the sheath 533 utilizing an adhesive layer 534 positioned on the sheath 533 adjacent to the raised lip portion 533d of the sheath 533. In other embodiments, the object may be sealed to the device 510 using any of the object sealing means described above and illustrated in connection with FIG. 1 through FIG. 14. Alternatively, the object may be pressed into the device 510 after abutting the ridges 532g' without rotating the object. In this case, the tapered upper surfaces of the ridges 532g' permit the object to displace (slide) the secondary tab members 532 further into the chamber 540 so that only the ridges 532g' may abut the exterior surface of the object. In this case, the object is pressed directly into the device 510 until the distal end of the object makes contact with and is sealed to the sheath 533 by the object sealing means. After the object sealing means have been used to seal the object to the internal member 530, and the item (pipe 511) has been connected to the casing member 520 using the item connecting means (MIP connector 550), fluids may be transmitted from the interior space of the object to the interior space 512 of the pipe 511, or vice versa, in a manner that provides a fluid-tight seal between the object and the pipe 511.

As a result, the device 510 may efficiently accommodate objects that have threaded ends and those that do not have threaded ends. For example, if the object has threaded ends, the device 510 operates in substantially the same manner as the devices 10, 110, 210, 310 described above and illustrated in connection with FIG. 1 through FIG. 14. On the other hand, if the object does not have threads, the entire contacting surface 532d of the primary tab members 532 may be adjacent to the object to hold it in place by friction relative to the device 510, and the secondary tab members 532' are able to recess further into the chamber 540, while the ridges 532g' abut the surface of the object and also tend to hold the object in place relative to the device 510 by friction. Referring to FIG. 2 as an example, this avoids a possible disadvantage arising where an object (pipe 15) without threads is inserted into (and received by) the device 10. In this case, the object (pipe 15) may contact the ridges 32g and be stopped short of reaching the object sealing means. Alternatively, if the ridges 32g have substantially the same shape as the ridges 532g' of the device 510, the object (pipe 15) may reach the object sealing means, but the ridges 32g may cause the tab members 32 to be held adjacent to the object (pipe 15) only at the ridges 32g and the point of the contacting surface 32d that is adjacent to the tapered surface 32c of the tab members 32. Because the portion of the interior surface 32b making contact with the surface of the object (pipe 15) may be reduced in such circumstances, the ability of the tab members 32 to hold the object (pipe 15) in place relative to the device 10 by friction may be somewhat hampered. As described above, the device 510 obviates this problem, and therefore represents the most preferred embodiment of the present invention.

What is claimed is:

1. A device for connecting an item having an interior space to an object having an interior space, the device comprising:
    (a) a casing member having a casing interior space and an item opening and an object opening each adjoining the casing interior space, wherein the object opening is of a size and shape adapted to receive the object;
    (b) an internal member positioned within the casing interior space, the internal member comprising:
        (i) a core member having:
            (A) a core interior space and an internal object opening and an internal item opening each adjoining the core interior space, wherein the internal object opening is of a size and shape adapted to receive the object; and
            (B) at least two tab openings in the core member, each of the at least two tab openings being of a size and shape adapted to receive a tab member; and
        (ii) at least two tab members, wherein each of the at least two tab members corresponds to a tab opening in the core member and is slideably positioned within one of the at least two tab openings; and
    (c) internal member sealing means adapted for sealing the internal member to the casing member and the object in a manner that creates a chamber in the space bounded by the casing member, the internal member, and the object, wherein the space within the chamber is in fluid communication with the interior space of the object;
    (d) wherein:
        (i) a portion of the object is adapted to extend through the object opening and the internal object opening into the core interior space of the internal member;
        (ii) the object is adapted to be held in position relative to the at least two tab members by friction between the object and the at least two tab members; and
        (iii) the item opening is adapted to be connected to the item, permitting the interior space of the item to be in fluid communication with the fluid-tight chamber and the interior space of the object.

2. The device of claim 1, wherein the casing member is further comprised of a case body having two end portions, a case base connected to the case body in a fluid-tight manner at one end portion of the case body, a case cap, and case cap connecting means for removably or permanently connecting the case cap to the other end portion of the case body.

3. The device of claim 2, wherein:
    (a) the case body is approximately tubular in shape; and
    (b) the core member is approximately tubular in shape, the internal object opening is comprised of the opening at one end of the tubular-shaped core member, the internal object opening is positioned approximately adjacent to the object opening in the casing member, and the at least two tab openings are positioned in the tubular wall of the core member.

4. The device of claim 3, wherein the surfaces of the at least two tab members facing the object are arcuate in shape.

5. The device of claim 1, wherein the at least two tab members further comprise object gripping means adapted for holding the object in position relative to the at least two tab members.

6. The device of claim 5, wherein the object gripping means are comprised of at least one ridge on the surface of each of the at least two tab members facing the object.

7. The device of claim 5, wherein the object gripping means are comprised of a gritted portion on the surface of each of the at least two tab members facing the object.

8. The device of claim 1, wherein the core member has at least three, but no more than ten tab openings, and the internal member is comprised of at least three, but no more than ten, tab members.

9. The device of claim 8, wherein the core member has three tab openings and the internal member is comprised of three tab members.

10. The device of claim 1, wherein the internal member sealing means are comprised of a semi-flexible sheath positioned on the exterior surface of the internal member.

11. The device of claim 10, wherein the internal member sealing means are further comprised of an adhesive that seals the distal end of the object to the sheath.

12. The device of claim 1, wherein the internal member sealing means comprise object sealing means for sealing the object to the device.

13. The device of claim 1, further comprising mechanical compression means positioned in the chamber adapted for forcing the at least two tab members against the object.

14. The device of claim 13, wherein the mechanical compression means are comprised of at least one spring mechanism.

15. The device of claim 13, wherein the mechanical compression means are comprised of at least one compressible insert.

16. The device of claim 1, further comprising the object.

17. The device of claim 1, further comprising the item.

18. The device of claim 1, further comprising item connecting means for operatively connecting the item to the device.

19. A method of constructing the device of claim 1, the method comprising
    operatively positioning the internal member within the casing member.

20. A device for connecting an item having an interior space to an object having an interior space, the device comprising:
    (a) a hollow casing member having an item opening of a size and shape adapted to connect to the item, and an object opening of a size and shape adapted to receive the object;

(b) a hollow internal member positioned within the casing member, the internal member comprising:
  (i) a core member having:
    (A) an internal object opening of a size and shape adapted to receive the object, and positioned approximately adjacent to the object opening in the casing member;
    (B) an internal item opening; and
    (C) at least two tab openings in the core member, each of the at least two tab openings being of a size and shape adapted to receive a tab member; and
  (ii) at least two tab members, wherein each of the at least two tab members corresponds to a tab opening in the core member, and each of the at least two tab members is slideably positioned within one of the at least two tab openings; and
(c) at least one sealing member to operatively seal the at least two tab openings and to operatively seal the core member to the casing member and the object; and
(d) item connecting means for operatively connecting the item to the casing member at the item opening;
(e) wherein:
  (i) a portion of the object is adapted to be positioned within the interior space of the internal member approximately adjacent to the at least two tab members; and
  (ii) the device is adapted to hold the object in position relative to the internal member by friction between the object and the at least two tab members.

21. The device of claim 20, wherein the casing member and the core member are each approximately tubular in shape.

22. The device of claim 20, wherein the core member has three tab openings and the internal member comprises three tab members.

23. The device of claim 20, wherein the at least one sealing member is comprised of a semi-flexible sheath positioned on the exterior surface of the core member.

24. The device of claim 23, wherein the at least one sealing member is further comprised of an adhesive adapted to seal the distal end of the object to the sheath.

25. The device of claim 20, wherein the at least one sealing member is comprised of an upper sealing member that is positioned between the portion of the core member adjacent to the internal object opening and the portion of the casing member adjacent to the object opening, wherein the upper sealing member creates a fluid-tight seal between the core member and the casing member at such position.

26. The device of claim 20, wherein the at least one sealing member is comprised of a lower sealing member that is positioned between the portion of the core member adjacent to the internal item opening and the portion of the casing member adjacent to the item opening, wherein the lower sealing member creates a fluid-tight seal between the core member and the casing member at such position.

27. The device of claim 26, wherein the at least one sealing member is further comprised of an adhesive adapted to seal the distal end of the object to the lower sealing member.

28. The device of claim 20, further comprising mechanical compression means positioned in the chamber and adapted for forcing the at least two tab members against the object.

29. A method of connecting the object to the item using the device of claim 20, the method comprising the following actions performed in any order:
(a) inserting the object into the object opening and the internal object opening of the device so that the at least one sealing member seals the internal member to the casing member and the object in a fluid-tight manner; and
(b) connecting the item to the device using the item connecting means.

30. The device of claim 20, further comprising object gripping means adapted for holding the object in position relative to the at least two tab members.

31. A device for connecting an item having an interior space to an object having an interior space, the device comprising:
(a) a hollow casing member having an item opening and an object opening that is of a size and shape adapted to receive the object;
(b) a hollow internal member positioned within the casing member, the internal member comprising:
  (i) a hollow core member having:
    (A) an internal object opening of a size and shape adapted to receive the object, and positioned approximately adjacent to the object opening in the casing member;
    (B) an internal item opening;
    (C) at least two secondary tab openings in the core member, each of the at least two secondary tab openings being of a size and shape adapted to receive a secondary tab member; and
    (D) at least two primary tab openings in the core member positioned between the at least two secondary tab openings and the internal object opening, each of the at least two primary tab openings being of a size and shape adapted to receive a primary tab member;
  (ii) at least two primary tab members, wherein each of the at least two primary tab members corresponds to a primary tab opening in the core member, and each of the at least two primary tab members is slideably positioned within one of the at least two primary tab openings; and
  (iii) at least two secondary tab members, wherein each of the at least two secondary tab members corresponds to a secondary tab opening in the core member, and each of the at least two secondary tab members is slideably positioned within one of the at least two secondary tab openings;
(c) internal member sealing means adapted for operatively sealing the internal member to the casing member and the object;
(d) wherein:
  (i) a portion of the object is adapted to be positioned within the interior space of the internal member approximately adjacent to the at least two primary tab members and the at least two secondary tab members; and
  (ii) the object is adapted to be held in position relative to the internal member by friction between the object and the at least two primary tab members and the object and the at least two secondary tab members; and
  (iii) the item opening is of a size and shape adapted to be connected to the item, permitting the interior space of the item to be in fluid communication with the interior space of the object.

32. The device of claim 31, wherein the casing member is further comprised of a case body having two end portions, a case base connected to the case body in a fluid-tight manner at one end portion of the case body, a case cap, and case cap connecting means for removably or permanently connecting the case cap to the other end portion of the case body.

33. The device of claim 32, wherein:
   (a) the case body is approximately tubular in shape; and
   (b) the core member is approximately tubular in shape, the internal object opening is comprised of the opening at one end of the tubular-shaped core member, the internal object opening is positioned approximately adjacent to the object opening in the casing member, and the at least two primary tab openings and the at least two secondary tab openings are positioned in the tubular wall of the core member.

34. The device of claim 33, wherein the surfaces of the at least two primary tab members and the at least two secondary tab members facing the object are arcuate in shape.

35. The device of claim 31, wherein each of the at least two primary tab members or each of the at least two secondary tab members or each of the at least two primary tab members and at least two secondary tab members further comprise object gripping means to assist in holding the object operatively in position.

36. The device of claim 35, wherein the at least two secondary tab members comprise a ridge on the surface thereof that faces the object, but the at least two primary tab members do not have a ridge on the surface thereof that faces the object.

37. The device of claim 31, wherein the core member has three primary tab openings and three secondary tab openings, and the internal member is comprised of three primary tab members and three secondary tab members.

38. The device of claim 31, wherein the internal member sealing means are comprised of a semi-flexible sheath positioned on the exterior surface of the internal member.

39. The device of claim 31, further comprising primary mechanical compression means positioned in the chamber and adapted for forcing the at least two primary tab members against the object.

40. The device of claim 31, further comprising secondary mechanical compression means positioned in the chamber and adapted for forcing the at least two secondary tab members against the object.

41. A method of connecting the object to the item using the device of claim 31, the method comprising the following actions performed in any order:
   (a) inserting the object into the object opening and the internal object opening of the device so that the internal member sealing means seals the internal member to the casing member and the object in a fluid-tight manner; and
   (b) connecting the item to the device using item connecting means.

42. A device for connecting to an object having an object interior space, wherein the object is comprised of an open end in fluid communication with the object interior space, which open end has a size and shape within a predetermined range, the device comprising:
   (a) a casing member having a casing interior space and an object opening adjoining the casing interior space, wherein the object opening is of a size and shape adapted to receive the object;
   (b) a core member having a core interior space, an internal object opening and at least two tab openings each adjoining the core interior space, wherein the internal object opening is of a size and shape adapted to receive the object, and each of the at least two tab openings is of a size and shape adapted to receive a tab member;
   (c) at least two tab members, wherein each of the at least two tab members corresponds to a tab opening in the core member and is slideably positioned within one of the at least two tab openings; and
   (d) an elastic, semi-flexible sheath positioned on all or a portion of the external surface of the core member;
   (e) wherein:
      (i) the core member is positioned within the interior space of the casing member, so that a portion of the core member surrounding the perimeter of the internal object opening is positioned adjacent to a portion of the casing member surrounding the perimeter of the object opening with a portion of the sheath being positioned between and assisting in forming a seal between such perimeter surrounding portions of the casing member and the core member;
      (ii) the portion of the object adjacent to the open end thereof is adapted to be positioned within the core interior space of the core member adjacent to a portion of the at least two tab members;
      (iii) a portion of the sheath is adapted to be sealed to a portion of the object adjacent to the open end of the object; and
      (iv) the object is adapted to be held in position relative to the at least two tab members by friction between the object and the at least two tab members.

43. The device of claim 42, wherein the device is further comprised of item connecting means adapted for connecting an item to the device, wherein the casing member is further comprised of an item opening in fluid communication with the interior space of the casing member, the core member is further comprised of an internal item opening in fluid communication with the core interior space of the core member, the item is connected to the item opening of the casing member using the item connecting means, and the interior space of the item is in fluid communication with the object interior space.

44. The device of claim 42, further comprising a mechanical compression member positioned between the core member and the casing member and adapted to force at least one of the at least two tab members against the object.

* * * * *